United States Patent
Aument

(10) Patent No.: US 11,182,794 B1
(45) Date of Patent: Nov. 23, 2021

(54) DETECTING UNAUTHORIZED DEVICES USING PROXIMITY SENSOR(S)

(71) Applicant: Square, Inc., San Francisco, CA (US)

(72) Inventor: Todd A. Aument, San Francisco, CA (US)

(73) Assignee: Square, Inc., San Francisco, CA (US)

( * ) Notice: Subject to any disclaimer, the term of this patent is extended or adjusted under 35 U.S.C. 154(b) by 297 days.

(21) Appl. No.: 15/940,620

(22) Filed: Mar. 29, 2018

(51) Int. Cl.
| | | |
|---|---|---|
| *G06F 7/04* | (2006.01) | |
| *G06F 1/24* | (2006.01) | |
| *G06Q 20/40* | (2012.01) | |
| *G06Q 20/32* | (2012.01) | |
| *G07F 19/00* | (2006.01) | |
| *H04W 8/00* | (2009.01) | |
| *H04L 29/06* | (2006.01) | |

(52) U.S. Cl.
CPC ..... *G06Q 20/4016* (2013.01); *G06Q 20/3226* (2013.01); *G07F 19/2055* (2013.01); *H04L 63/1475* (2013.01); *H04W 8/005* (2013.01)

(58) Field of Classification Search
CPC ............ G06Q 20/4016; G06Q 20/3226; G07F 19/2055; H04L 63/1475; H04W 8/005
USPC .......................................................... 726/26
See application file for complete search history.

(56) References Cited

U.S. PATENT DOCUMENTS

| | | |
|---|---|---|
| 5,870,289 A | 2/1999 | Tokuda et al. |
| 5,960,084 A | 9/1999 | Angelo |
| 6,056,193 A | 5/2000 | McAuliffe et al. |
| 6,786,420 B1 | 9/2004 | Silverbrook |
| 7,096,192 B1 | 8/2006 | Pettitt |
| 7,124,170 B1 | 10/2006 | Sibert |
| 7,343,496 B1 | 3/2008 | Hsiang et al. |
| 7,533,276 B2 | 5/2009 | Matsushima et al. |
| 7,837,110 B1 | 11/2010 | Hess et al. |
| 7,866,544 B1 * | 1/2011 | Block ................ G06Q 20/3224 235/379 |
| 7,878,397 B2 | 2/2011 | Mirkazemi-Moud et al. |
| 8,344,881 B1 | 1/2013 | Hays |

(Continued)

FOREIGN PATENT DOCUMENTS

| | | |
|---|---|---|
| EP | 2 031 537 A1 | 3/2009 |
| EP | 3 537 745 A1 | 9/2019 |

(Continued)

OTHER PUBLICATIONS

Extended European Search for European Patent Application No. 19171224.9, dated May 22, 2019.

(Continued)

*Primary Examiner* — Haresh N Patel
(74) *Attorney, Agent, or Firm* — Lee & Hayes, P.C.

(57) ABSTRACT

A payment reader and a POS terminal may communicate over a wireless connection. The methods and systems include monitoring one or more parameters corresponding to a payment reader and another device in proximity to the payment reader. The first device, through a set of customized instructions, determines whether behavior of the second device substantially corresponds to the first device, in order to detect suspected hardware or software intrusion associated with the secure first device. On successful detection of a suspected intrusion, the first device generates an alert for a user of the first device if illegal intrusion is suspected by the processor.

20 Claims, 7 Drawing Sheets

(56) References Cited

U.S. PATENT DOCUMENTS

| | | | |
|---|---|---|---|
| 8,499,173 | B2 | 7/2013 | Caci |
| 8,786,272 | B2 | 7/2014 | Carapelli et al. |
| 9,342,717 | B2 | 5/2016 | Claessen |
| 9,479,340 | B1 | 10/2016 | Miller et al. |
| 9,575,840 | B1 | 2/2017 | Spangler et al. |
| 9,589,427 | B1* | 3/2017 | Ohlsson ............... G06K 7/087 |
| 9,659,178 | B1 | 5/2017 | Wade |
| 9,665,870 | B1 | 5/2017 | Rezayee et al. |
| 9,747,570 | B1* | 8/2017 | Vescio ............... G06F 21/577 |
| 9,778,711 | B2 | 10/2017 | Chang |
| 9,799,180 | B1 | 10/2017 | Rezayee et al. |
| 9,892,293 | B1 | 2/2018 | Wade et al. |
| 10,127,409 | B1 | 11/2018 | Wade et al. |
| 10,255,603 | B1 | 4/2019 | Rezayee et al. |
| 10,262,326 | B1* | 4/2019 | Yaqub ............... G06Q 30/0185 |
| 10,282,552 | B1 | 5/2019 | Wade |
| 10,733,291 | B1 | 8/2020 | McLeod |
| 2003/0194071 | A1* | 10/2003 | Ramian ............... H04M 15/48 379/114.19 |
| 2004/0095830 | A1 | 5/2004 | Tanaka |
| 2006/0038011 | A1 | 2/2006 | Baker et al. |
| 2006/0118624 | A1* | 6/2006 | Kelso ............... G07F 19/20 235/444 |
| 2006/0155899 | A1 | 7/2006 | Knapp |
| 2007/0080225 | A1* | 4/2007 | Hirasawa ............ G06K 13/0893 235/449 |
| 2008/0091605 | A1 | 4/2008 | Hughes et al. |
| 2008/0198653 | A1 | 8/2008 | Brederlow et al. |
| 2008/0238681 | A1* | 10/2008 | Rodgers ............ G06K 19/07309 340/572.4 |
| 2010/0017621 | A1 | 1/2010 | Crawford |
| 2010/0065629 | A1* | 3/2010 | Wentker ............... G06Q 20/40 235/382 |
| 2010/0116877 | A1* | 5/2010 | Parmelee ............... G07F 17/42 235/379 |
| 2010/0264211 | A1 | 10/2010 | Jain et al. |
| 2010/0295664 | A1* | 11/2010 | Kim ............... H04L 9/003 340/10.41 |
| 2010/0327856 | A1 | 12/2010 | Lowy |
| 2011/0078034 | A1 | 3/2011 | Hayhow |
| 2011/0107136 | A1 | 5/2011 | Jonnagadla et al. |
| 2011/0187642 | A1 | 8/2011 | Faith et al. |
| 2011/0307711 | A1 | 12/2011 | Novak et al. |
| 2012/0056635 | A1 | 3/2012 | Oomura |
| 2012/0201379 | A1 | 8/2012 | Fuchs et al. |
| 2012/0274351 | A1 | 11/2012 | Pedersen et al. |
| 2013/0044003 | A1 | 2/2013 | Eguro et al. |
| 2013/0086691 | A1 | 4/2013 | Fielder |
| 2013/0119974 | A1 | 5/2013 | Chamarti et al. |
| 2013/0140364 | A1 | 6/2013 | McJones et al. |
| 2013/0179351 | A1 | 7/2013 | Wallner |
| 2013/0223225 | A1* | 8/2013 | Hui ............... H04L 41/0836 370/236 |
| 2013/0254431 | A1 | 9/2013 | Kuroiwa et al. |
| 2013/0339739 | A1 | 12/2013 | Hueber et al. |
| 2014/0025960 | A1 | 1/2014 | McLean |
| 2014/0181534 | A1 | 6/2014 | Nowottnick |
| 2014/0279103 | A1* | 9/2014 | Course ............... G07F 17/42 705/18 |
| 2014/0297540 | A1 | 10/2014 | Swamy et al. |
| 2014/0351125 | A1* | 11/2014 | Miller ............... G06Q 20/1085 705/43 |
| 2014/0372305 | A1* | 12/2014 | Ray ............... G07F 19/2055 705/44 |
| 2015/0012430 | A1 | 1/2015 | Chisholm et al. |
| 2015/0073980 | A1* | 3/2015 | Griffin ............... G06Q 20/3223 705/39 |
| 2015/0097572 | A1 | 4/2015 | Wade et al. |
| 2015/0169891 | A1 | 6/2015 | Hook et al. |
| 2015/0213427 | A1* | 7/2015 | Hodges ............... G07F 19/2055 705/18 |
| 2015/0331767 | A1 | 11/2015 | Bringivijayaraghavan et al. |
| 2016/0012445 | A1* | 1/2016 | Villa-Real ............ G06Q 20/36 705/44 |
| 2016/0029221 | A1 | 1/2016 | Garcia et al. |
| 2016/0078417 | A1* | 3/2016 | DeLuca ............... G01S 5/02 701/23 |
| 2016/0080107 | A1* | 3/2016 | Girouard ............ H04W 4/24 600/546 |
| 2016/0117225 | A1 | 4/2016 | Yu et al. |
| 2016/0171486 | A1* | 6/2016 | Wagner ............ G06Q 20/3278 705/39 |
| 2016/0203698 | A1* | 7/2016 | Steinbok ............ G08B 21/18 340/521 |
| 2016/0357963 | A1 | 12/2016 | Sherman |
| 2016/0359636 | A1 | 12/2016 | Kreft |
| 2017/0061130 | A1* | 3/2017 | Ghafoor ............ G06F 9/4406 |
| 2017/0103378 | A1 | 4/2017 | Pan |
| 2017/0178103 | A1* | 6/2017 | Peri ............... G06Q 20/322 |
| 2017/0236125 | A1 | 8/2017 | Guise et al. |
| 2018/0053189 | A1* | 2/2018 | Monk ............... G06Q 20/3223 |
| 2018/0191775 | A1* | 7/2018 | Watson ............... G06N 20/00 |
| 2018/0261051 | A1* | 9/2018 | Ooi ............... G07F 19/2055 |
| 2018/0295154 | A1* | 10/2018 | Crabtree ............ H04L 63/1408 |
| 2019/0073647 | A1* | 3/2019 | Zoldi ............... G06Q 30/0601 |
| 2019/0213845 | A1* | 7/2019 | Goedee ............... G07F 7/0873 |
| 2020/0029218 | A1* | 1/2020 | Hagey ............... H04L 67/18 |
| 2020/0065817 | A1 | 2/2020 | Guise et al. |

FOREIGN PATENT DOCUMENTS

| | | | |
|---|---|---|---|
| WO | 2017/139633 A1 | 8/2017 | |
| WO | 2018/111601 A1 | 6/2018 | |

OTHER PUBLICATIONS

Non-Final Office Action dated Oct. 3, 2018, for U.S. Appl. No. 15/476,324, of Wade, J., filed Mar. 31, 2017.
Final Office Action dated Oct. 19, 2018, for U.S. Appl. No. 15/043,233, of Guise, M., et al., filed Feb. 12, 2016.
Notice of Allowance dated Nov. 28, 2018, for U.S. Appl. No. 15/693,456, of Rezayee, A., et al., filed Aug. 31, 2017.
Notice of Allowance dated Dec. 12, 2018, for U.S. Appl. No. 15/476,324, of Wade, J., filed Mar. 31, 2017.
Notice of Allowance dated Jun. 27, 2019, for U.S. Appl. No. 15/043,233, of Guise, M., et al., filed Feb. 12, 2016.
Non-Final Office Action dated Aug. 25, 2016, for U.S. Appl. No. 14/183,118, of Wade, J., filed Feb. 18, 2014.
Non-Final Office Action dated Sep. 15, 2016, for U.S. Appl. No. 15/011,347, of Rezayee, A., et al., filed Jan. 29, 2016.
Notice of Allowance dated Jan. 20, 2017, for U.S. Appl. No. 14/183,118, of Wade, J., filed Feb. 18, 2014.
Notice of Allowance dated Jan. 26, 2017, for U.S. Appl. No. 15/011,347, of Rezayee, A., et al., filed Jan. 29, 2016.
Non-Final Office Action dated Apr. 3, 2017, for U.S. Appl. No. 15/382,165, of Wade, J., et al., filed Dec. 16, 2016.
Notice of Allowance dated Jun. 21, 2017, for U.S. Appl. No. 15/011,367, of Rezayee, A., et al., filed Jan. 29, 2016.
Notice of Allowance dated Sep. 19, 2017, for U.S. Appl. No. 15/382,165, of Wade, J., et al., filed Dec. 16, 2016.
Non-Final Office Action dated Jan. 11, 2018, for U.S. Appl. No. 15/382,122, of Wade, J., et al., filed Dec. 16, 2016.
Non-Final Office Action dated Apr. 18, 2018, for U.S. Appl. No. 15/043,233, of Guise, M., et al., filed Feb. 12, 2016.
Non-Final Office Action dated Jun. 5, 2018, for U.S. Appl. No. 15/693,456, of Rezayee, A., et al., filed Aug. 31, 2017.
Notice of Allowance dated Jul. 26, 2018, for U.S. Appl. No. 15/382,122, of Wade, J., et al., filed Dec. 16, 2016.
International Search Report and Written Opinion for International Application No. PCT/US2017/017453, dated Mar. 30, 2017.
International Search Report and Written Opinion for International Application No. PCT/US2017/064545, dated Feb. 28, 2018.
Notice of Allowance dated Mar. 23, 2020, for U.S. Appl. No. 16/005,192, of McLeod, C., filed Jun. 11, 2018.
Advisory Action dated Dec. 31, 2018, for U.S. Appl. No. 15/043,233, Guise, M., et al., filed Feb. 12, 2016.
Non-Final Office Action dated Feb. 7, 2019, for U.S. Appl. No. 15/043,233, of Guise, M., et al., filed Feb. 12, 2016.

(56) References Cited

OTHER PUBLICATIONS

Office Action for European Patent Application No. 19171224.9, dated Sep. 11, 2020.
Office Action for European Patent Application No. 19171224.9, dated Jan. 27, 2021.
Non-Final Action dated Mar. 18, 2021, for U.S. Appl. No. 16/666,311, of Guise, A., et al. filed Oct. 28, 2019.
Non-Final Action dated Jun. 18, 2021, for U.S. Appl. No. 15/940,633, of Aument T.A, filed Mar. 29, 2018.

* cited by examiner

DETECTING UNAUTHORIZED DEVICES USING PROXIMITY SENSOR(S)

TECHNICAL FIELD

Customers can perform financial transactions, such as withdraw cash, deposit cash, pay for a product or service, obtain account information, etc., at automatic teller machines (ATM), vending machines, and payment systems. Such systems comprise various input devices, such as card readers and PIN pads, which are configured to accept data necessary to process the payment. The customer may provide certain payment data by presenting a payment card bearing a magnetic stripe or chip to a payment card reader. Data stored on the payment card may include one or more of the following: a Primary Account Number (PAN), the cardholder's name, a service code, and the card's expiration date. Also, if required to complete the transaction, the customer may enter account information such as a personal identification number (PIN) using a PIN entry device (e.g., a PIN pad). The system communicates the data to a remote host system responsible for the customer's account for verification.

Fraud poses continuing challenges to customers, merchants, and banks, among others. One example of such fraud is known as "skimming," which generally refers to any unauthorized attempt to acquire data associated with a transaction at an input device. Such data can include credit or debit card numbers, PINs, or other account information. Those of skill in the art are familiar with examples of techniques used to "skim" transaction data, which often involve the placement of an inconspicuous device capable of capturing data in the vicinity of an input device. For instance, fraudsters may overlay a data capture device resembling a card reader or keypad on the actual card reader or keypad so that, when a user completes a transaction, the overlaid device simultaneously captures the user's account information. In some cases, the data capture device also transmits the captured data to the fraudsters. To further avoid detection, skimmers have also placed data-capture devices within an input device or behind a bezel or fascia in which an input device is mounted. In other cases, fraudsters have installed small, unobtrusive cameras in the vicinity of a PIN pads to capture PINs.

Attempts have been made to combat fraud caused by skimming. Known methods include ultrasonic monitoring of an area in front of a card reader or for changes in "acoustic impedance." Other methods include narrowband monitoring for electrical emissions and attempts at electronic "jamming" of a skimming device overlaid on an input device. As those of skill in the art are aware, however, these methods suffer from a variety of drawbacks. With the ultrasonic monitoring method, for example, temperature and humidity compensation can complicate attempts to detect a change in "acoustic impedance" in the area surrounding the mouth of a payment card reader. Further, ultrasonic monitoring of the area in front of the card reader has limited resolution, it cannot monitor the card reader interior, and the potential locations of ultrasonic transceivers are constrained by the layout of the card reader bezel.

BRIEF DESCRIPTION OF THE DRAWINGS

The above and other features of the present disclosure, its nature and various advantages will be more apparent upon consideration of the following detailed description, taken in conjunction with the accompanying drawings in which.

Figure 1A:
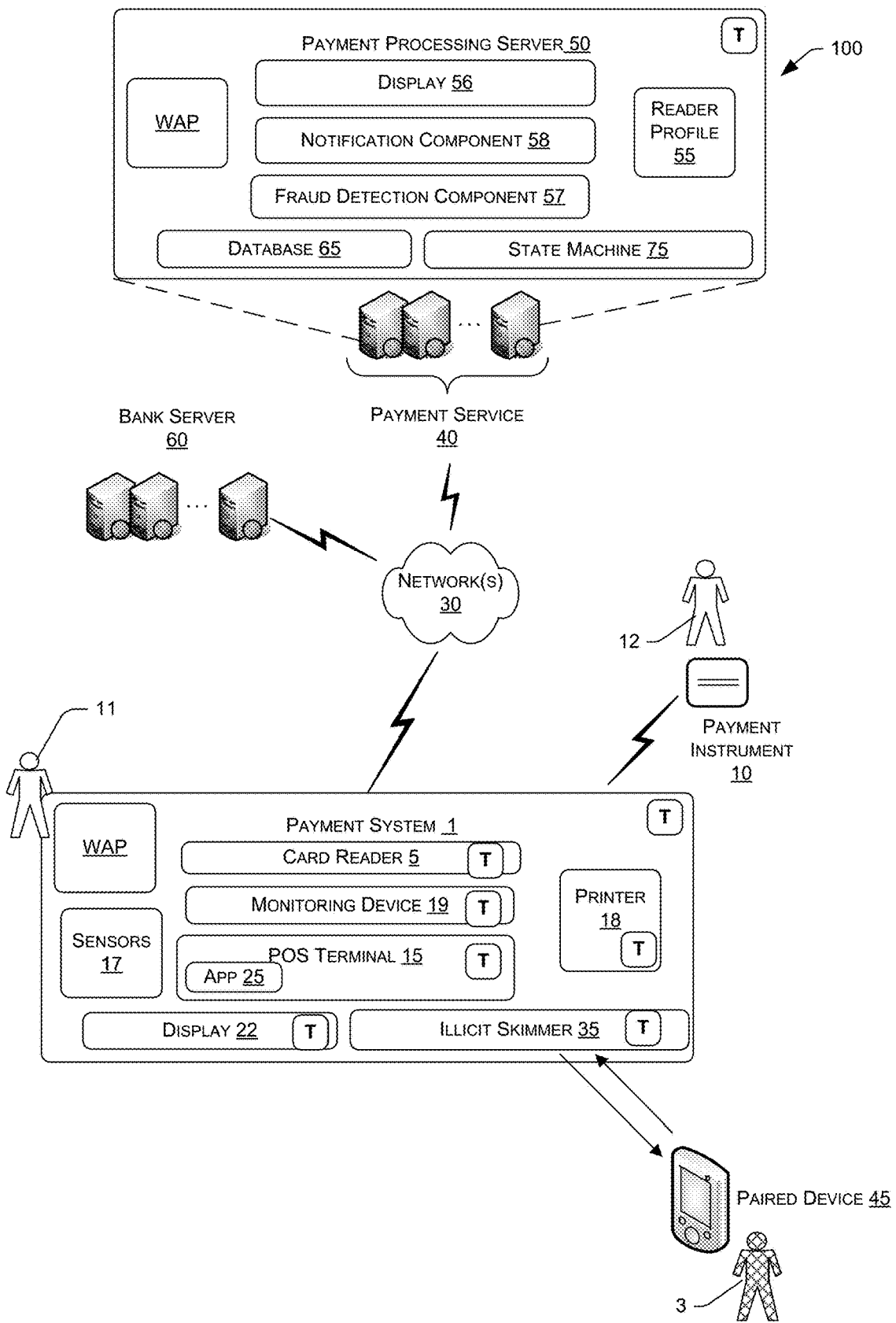
FIG. 1A depicts an illustrative block diagram of a payment system in accordance with some embodiments of the present disclosure.

In the figures, the left-most digit(s) of a reference number identifies the figure in which the reference number first appears. The use of the same reference numbers in different figures indicates similar or identical items or features. Moreover, multiple instances of the same part are designated by a common prefix separated from the instance number by a dash. The drawings are not to scale.

DETAILED DESCRIPTION

A payment system may include a point-of-sale (POS) terminal and a payment reader. The payment reader may physically interact with payment instruments, such as magnetic stripe payment cards, EMV payment cards and NFC payment instruments. The POS terminal may provide a rich user interface, communicate with the payment reader, and also communicate with a payment server. In this manner, the POS terminal and payment reader may collectively process transactions between a merchant and a customer.

The payment reader and the POS terminal may communicate over a wireless connection, such as Bluetooth low energy (BLE). The POS terminal may be a mobile device running a point-of-sale application, for example an application that shows an inventory of available items, status of order, and so on. During typical operation, numerous mobile devices will be within range of the payment reader. Furthermore, there may be several payment readers within the range of the mobile devices, such as POS terminals. In order to manage its connections, the payment reader may establish a procedure for maintaining a connection with a mobile device belonging to the merchant, for example through Bluetooth or BLE communication protocols.

The payment reader may be connected to a payment terminal and may already be interacting with the terminal to exchange information. Alternatively, the payment terminal may already be connected to the payment reader. While in the connected state, the payment reader and the mobile device may periodically interact and engage in payment transactions.

The payment systems are normally comprised of a magnetic card or microchip reader, an alpha-numerical keypad for the user to enter codes and information, and a display for displaying information allowing the user himself/herself to interact with the automatic terminal so as to carry out the desired transaction.

The use of the payment systems normally implies the insertion by the user of a magnetic stripe card, hereinafter simply referred to as "credit card", in the slot of the appropriate reader, and the subsequent input of a personal identification number (PIN) associated to the card, but only known to the user, on the basis of the instructions shown on the display the payment system is provided with. If the automatic terminal recognizes the validity of the code entered by the user and its association with the inserted card, it authorizes the execution of the requested operation.

In recent years, the use of these payment systems has greatly increased and, along with the increase in the use thereof, events of damage to and tampering with the payment systems have also enormously increased, these events compromising the functionality thereof or allowing to make use of the offered services and money transfers connected thereto in a fraudulent manner.

For instance, in order for a unauthorized person to gain access to benefits restricted to another person's credit card and maybe effect unauthorized accesses to his or her money deposits, it is ideal to both obtain the data stored in the card, and find out the corresponding PIN or other possible means used to confirm the identity of the user of said card. It is therefore clear that the main targets of the above said frauds include credit card readers, the step of inputting the identification data of the user and means used for such a purpose.

To gain unauthorized access, a fraudulent actor may plant, in a hardware or software form, a Trojan to either detect the information being exchanged between otherwise trusting parties and report to another untrusted device, The untrusted device may instead fraudulently process transactions or modify the information in the current transaction to debit to a fraudulent actor's card.

The most commonly used systems for such an unauthorized access comprise the fitting of false interfaces in the slot of the magnetic card reader of the payment system in order to intercept the relevant data as they are communicated during a normal transaction by the user. Often, said false interfaces comprise an additional magnetic card reader so that the information stored in the introduced card may be read as soon as the card is inserted in the slot of the magnetic card reader of the automatic terminal. The data which are intercepted in this manner may then be used to manufacture a counterfeit card by "cloning" the original card.

In a similar manner, to obtain the PIN of the person whose card is being cloned, a false keypad may be employed, which is overlapped to the alpha-numerical keypad of the payment system so that, when the person enters his or her PIN, the entered sequence is recorded by the false keypad, later retrieved and used in conjunction with a counterfeit card as previously seen in order to carry out fraudulent withdrawals of funds from his or her account, these withdrawals possibly continuing even for a considerable period of time before being discovered.

To this end, the implementations described herein disclose a device which may counteract the practices described, so as to guarantee the secrecy of the transfer of the information connected to the use of credit cards and the like in automatic terminals. Furthermore, the implementations describe a device that can verify the correct operation of payment terminals and the absence of tampering therewith for any purpose, with particular reference to the field of payment terminals provided with credit card type card readers. For example, the fraudulent actor may physically introduce a false interface associated with or including a portable and wireless transceiver into an unsuspecting and legitimate payment reader, again unbeknownst to the actual customer or merchant. In one implementation, the methods and systems described herein identify the false interface in the device in question, determine if any other device in the field may have been attacked by the same or similar fraudulent actor, and accordingly, perform remedial actions in response to detection of such false interface.

Some of the attacks addressed herein fall under the category of man-in-the middle (MITM) attacks. An MITM attack is an attack in which the fraudulent actor is able to read, insert or modify at will, messages between two parties, such as the payment reader and the payment terminal, without either party knowing that the communications path between them has been compromised. In order to implement the attack the fraudulent actor which will typically comprise a software process rather than a person as such, may be able to observe and intercept messages going between the two "victims".

One way of establishing an MITM attack is by using a so-called Trojan horse, or simply Trojan, attack. Trojan is a piece of executable software that portrays itself as something other than what it is at the point of execution. Trojan is typically sent by someone, for example a fraudulent actor, or carried by another program and may arrive unsuspiciously or as an update of sorts, which may be attached to an apparently-innocuous email. In general, the malicious functionality of a Trojan may be anything undesirable for a computer user, including data destruction or compromising a system by providing a means for another computer to gain access, thus bypassing normal access controls. The Trojan, as used herein, can also be an unauthorized hardware device, such as a skimmer or shimmer, that can stage an MITM or MITM-like attack on the device with which it is associated, by secure sockets layer (SSL) sniffing or recording the information being shared between authorized devices, such as the reader and the terminal, and relaying the sniffed information to a neighboring computing device or a remote server. The receiving device or server can then use the sniffed information fraudulently, for example to charge a customer of unauthorized purchases.

Thus, in these scenarios, the fraudulent actor does not need even charge the card right at that time, but only collect the information for later use, in what amounts as a "replay attack." For this, the wireless transceiver can collect the data and wirelessly transmit to a paired device belonging to a fraudulent actor. In this way, the actor never has to remove the once planted false interface to extract the data. Thus, the transactions can be performed on the merchant's reader while the merchant and customer are connected, for example by sending the sniffed data to the fraudulent actor's reader.

In order to subvert an online transaction, for example by facilitating an MITM attack, the presence of Trojan would typically need to remain unknown to the customer on whose computer it was executed. To do this, the fraudulent actor may inject or otherwise associate a device having bare minimum components to simply sniff information out of the reader, as mentioned above, with or without explicit connection to any component of the reader/host to generate, reconstruct, or rebuild a replacement, fraudulent payment request at the time of merchant operations or at a later time. So, in one implementation, the fraudulent actor may place a Trojan, such as a transceiver, in close proximity to the reader or inside the reader, for example close to the reader's transceiver, to reduce the chance of detectability and make it difficult for the merchant to detect the anomalies. Difficult here means difficult in practical terms, for example within a reasonable amount of time, using a reasonable amount of computing power in the circumstances, using visual inspection, or without tampering the device. This is an unfavorable and unacceptable application of portable payment readers that operate on wireless and non-secure communication protocols.

To this end, the implementations described herein provide systems and techniques to detect a Trojan by monitoring or detecting relative change in a parameter, e.g., signal strengths, power levels, or any other measurable value, of the reader due to injection of a parasitic device, such as false interface having software or hardware Trojan embedded therein. In some implementations, the systems and methods leverage the components within the reader, such as sensors, that are configured for payment related activities. In some implementations, specific components, such as accelerometer, RSSI measurement, the servo motor, radio frequency identification (RFID) sensors, infrared (IR) sensors, frequency sensors, temperature sensors, the pressure sensor, the accelerometer, the gyrator, motion sensors, optical sensors, tactile sensors, proximity sensors, and the like, may be included specifically for such measurements.

In one implementation, the motion sensors track motion and position of the components, such as transceiver, where the components can be internal or external to the device. Based on the relative location, positioning, movement or lack of movement of the components with respect to each other, the motion sensors can determine whether there is an additional component located within the device or in proximity to the device that is unregistered or otherwise unknown to the reader. Accordingly, the unrecognized component can be deemed to be a Trojan. The reader can take additional actions such as alert the merchant, deactivate connection to one or both the components, suspend current transactions, and/or continue the transactions while obtaining more information of the unrecognized component. In some embodiments, the reader is configured to read the signals from multiple sources and based on how the signals are changing in relation to the reader, further determine whether a specific source is unauthorized. This can be done without any explicit directions to move the reader in a certain way, or any kind of motion detection.

In another embodiment, an existing BLE transceiver, for example that resides within the reader for the purposes of pairing to devices and applications, can be retrofitted to work, for example, in a monitoring/promiscuous/sniff mode, to detect other devices that are potentially unauthorized. The existing BLE transceiver in conjunction with other sensors can monitor another component, such as a fraudulent BLE transceiver and/or BLE transceivers of other devices, such as POS, or customer device, based on the signals or change of signals they are emitting. Accordingly, for example based on thresholds or timings (for example when the change is detected), the BLE transceiver can send signals to a security unit, or even the server, to disable normal operations of the reader. In one implementation, if the signal strength does not change based on the change in the orientation of the reader or as the reader is moved from one location to another, i.e., sideways, the reader or server deems that the component that remains substantially equidistant and unchanged with respect to signal strengths or other measured values, is a Trojan. As mentioned before, the reader or server can take appropriate actions at this time or indicate to the merchant, on a display, that there is a security breach that needs attention.

In another implementation, a reader can learn its regular position in relation to the merchant's point of sale terminal, in terms of either consistent movement or consistent same location or both. In the event of an MITM attack, there would be two components, such as BLE transceivers, that would remain unchanged with respect to a new location across the room and remain relatively stable. This should trigger the reader purge the connection to the seller's point of sale terminal, forcing them to repair as one of the components may be a fraudulent device.

In response to a server-generated message, such as an alert or notification, the payment reader may un-pair or otherwise disconnect itself from the terminal and eject any payment object. If a mobile device running a point-of-sale application receives the server-generated message, the mobile device may initiate the disconnection between previously paired devices or suspending all transactions, including the present transaction and all previously processed transactions that are still awaiting authorization.

In one implementation, the present disclosure discloses methods and systems to prevent payment processing in scenarios where an unrecognized device may have unsuspectingly made its way into a legitimate reader. Additionally, once the unrecognized reader is detected, the system can track behavior of other readers in the field and develop a specific model for the readers based on the behavioral analysis to detect any other unrecognized components that may have been planted in the same way. For example, by analyzing physical and performance attributes of the detected, unrecognized component within or associated with the reader, or any of its components, the server can help detect other such components in the wild by creating a profile of illegitimate components and executing similar verifications on all readers or readers that match the profile of the reader that was found to be infected. For example, the readers that match the profile of the specific reader can be another reader that is registered to the same merchant, similar merchants, merchants in the same geographical location, and so on. The server is in a position to identify readers with similar profiles. Furthermore, the server can, statically or dynamically, determines such readers of interest since the server communicates with all such readers. Such an architecture where all the readers communicate with the server without directly communicating with each other is useful in localizing the logic at a central location without any exchange of information or rules behind how and when these profiles are created.

In some embodiments, the model also predicts and includes within the model past, current, or predicted future state of the entire merchant environment. Any new state that is a deviation from the predicted state as defined by the model and where the deviation exceeds a threshold, is indicative of an unknown and risky behavior, akin to a fraud attack. On detecting that a behavior has changed, the server that perform the behavioral analysis sends notification to the merchant to check if the deviation in behavior is normal. If the behavior is indicated to be normal, the server initiates the process of authorizing the unauthorized device. If the behavior is not indicated to be normal, the server cancels any ongoing transactions and alerts the merchant.

In another implementation, the present subject matter discloses a method to obtain an original state of a payment entity, such as a payment reader or a POS terminal, based on a behavioral model that defines an expected behavior of the payment entity. The methods and systems detect a change in the original state of the payment entity, for example, if the payment entity moves in a manner different from its normal behavior, disconnects or connects with a new device, and so on. The server compares the change of the original state with a threshold value, also referred to as threshold deviation, defined by the behavioral model and if the change of state is not within the threshold deviation, the server either reverts the payment entity to the original state or notifies the merchant to take corrective actions. In some exemplary embodiments, sensing devices may be provided in proximity to or within the reader or terminal. Such sensors may be of the radiation sensing type or other type. Such sensors are adapted to sense the installation of unauthorized input intercepting devices above or adjacent to the slot or keypad based measure of values emitting from devices in those regions. The sensing of such an unauthorized device may cause an exemplary controller in the reader to give notice of the potential fraud device and/or to cease or modify the operation of the reader to reduce the risk of interception of customer inputs. In some exemplary embodiments, sensors used for sensing may provide outputs of visible light and may be used to guide a user at appropriate times during transactions to provide indications that the reader may be susceptible to unauthorized device intrusions.

Another kind of attack is contemplated in the present subject matter. Essentially, the fraudulent user can convert the merchant's reader into a skimmer by wirelessly connecting to the merchant's payment reader and downloading malware on the reader. To do so, the fraudulent user pairs his/her mobile device to the merchant mobile device by providing a user input such as a button push, when the merchant is not looking. Then through the mobile device of the fraudulent user, the fraudulent user can download suspicious software scripts or malware on the payment card reader, thereby taking complete control of the reader and all the data stored thereon unbeknownst to the merchant. Once the software or hardware of the payment reader is successfully tampered with, fraudulent user does not even need to be at the merchant location to carry out fraudulent activities.

To this end, in one implementation, the payment server stores the association between a payment application executing on a mobile device, such as payment terminal, and a component, such as a BLE transceiver of the payment reader. For example, the association may include mapping of a version of the payment application and a version of the BLE transceiver, or other such identifier. Each payment application is connected to a merchant and thus their financial account. Anytime there is a fraudulent user attempting to connect their device, and thereby, their financial account, to the reader, a request is sent to the server to compare whether the payment application executing on the new device, if any, is connected to the specific component of the card reader. If not, the primary merchant on the original payment application is sent a notification to confirm association of the second component, such as another BLE transceiver. Various other conditions may trigger the generation of request, for example, introduction of a unauthorized device, introduction of a previously known but disabled reader, introduction of a new payment application, introduction of a previously known but disabled payment application, addition of a new financial account, addition or association of a previously disabled financial account, and so on.

Other examples include, for example, (a) introducing the second device in proximity to the first device; (b) fraudulently accessing a payment account associated with the first device; (c) physically swapping a component of the first device with a component of the second device; (d) changing location of the first device; (e) performing a payment transaction using the second device in proximity to the first device; (f) performing a payment transaction using the second device in proximity to the first payment entity about a time when another payment transaction is in progress at the first device; (g) performing a payment transaction for an amount that is more than a predefined amount; (h) introducing the second device in a geographical perimeter; and (i) physically altering the first device.

The above systems and methods allow for a secure payment environment that prevents fraud due to a skimmer, shimmer, or an introduction of a hardware or software Trojan, which is further described below through figures and claims. The present systems and methods relate in general to unique such that the control of the device and as such the data processing may transition from one device to another, depending on where and how the fraudulent attack is detected. Talk about network architecture and client-server architecture.

With the term "authentication" or "monitoring," the process may be intended through a network of two or more separate entities, for instance, a client data processing unit and a server data processing unit in a client-server system, where the entities mutually implement processes to monitor and react to the fraudulent attack. In some implementations, the processes may be executed solely on a client device, a server device, or another local or remote device separate from the client or server.

Some of the implementations can be applied in the field of retail payment systems, such as those implemented at convenience stores, gas stations, grocery stores, car wash stations, automatic teller machines, vending machines, RFID scanners, checkout stations, and unattended payment readers. Such devices that fall under automatic payment terminals or self-service terminals, are hereinafter generally referred to as "automatic terminals", and cover any terminal that processes money transactions without merchant intervention.

Various embodiments and implementations of the disclosed fraud monitoring and detection technology are now described, for example from the perspective of data processing and network architecture. The following description provides specific details for a thorough understanding and an enabling description of these implementations. One skilled in the art will understand, however, that the disclosed system and methods may be practiced without many of these details. Additionally, some well-known structures or functions may not be shown or described in detail, so as to avoid unnecessarily obscuring the relevant description of the various implementations. The terminology used in the description presented below is intended to be interpreted in its broadest reasonable manner, even though it is being used in conjunction with a detailed description of certain specific implementations of the disclosed system and methods. Some frequently used terms are now described.

The phrases "in some embodiments," "according to various embodiments," "in the embodiments shown," "in one embodiment," "in other embodiments," "various embodiments," "some embodiments," and the like generally mean the particular feature, structure, or characteristic following the phrase is included in at least one embodiment of the present invention, and may be included in more than one embodiment of the present invention. In addition, such phrases do not necessarily refer to the same embodiments or to different embodiments.

If the specification states a component or feature "may", "can", "could", or "might" be included or have a characteristic, that particular component or feature is not required to be included or have the characteristic.

The term "component" refers broadly to software stored on non-transitory storage medium (e.g., volatile or non-volatile memory for a computing device), hardware, or firmware (or any combination thereof) components. Components are typically functional components that can generate useful data or other output using specified input(s). A component may or may not be self-contained. An application program (also called an "application") may include one or more components, or a component can include one or more application programs.

The term "registration application" or "payment application" as used here, refers to any registration application that enables communication between users (e.g., sender and recipient of a message) over a wired or wireless communications network. The registration application can be employed by a service provider that delivers a communication service to users, e.g., chat capability or capability to enter payment information, for example through a form. The registration application may include one or more components and/or engines, or a component and/or engine can include one or more applications. The registration application can include, for example, a mobile payment application, a text messaging application for communication between phones (e.g., conventional mobile telephones or smartphones), or a cross-platform instant messaging application for smartphones and phones that use the Internet for communication.

The registration application can also include, for example, a web browser application installed on the POS terminal of the merchant accessible via a uniform resource locator (URL). In some embodiments, the URL is identified by a graphical user interface (GUI) of a mobile payment application installed on the POS terminal.

The term "Bluetooth®" refers to a specification for a small form-factor, low-cost radio solution providing links between mobile computers, mobile phones and other portable and handheld devices. Of particular interest is Bluetooth's low power consumption and short range, coupled with the ability of Bluetooth devices to automatically attach to other Bluetooth devices that are close by, typically within 10 meters or less.

Bluetooth wireless technology is an international, open standard for allowing intelligent devices to communicate with each other through wireless, short-range communications. This technology allows any sort of electronic equipment—from computers and cell phones to keyboards and headphones—to make its own connections, without wires, cables or any direct action from a user. Bluetooth is currently incorporated into numerous commercial products including laptops, PDAs, cell phones, and printers, with more products coming out every day.

Bluetooth is a frequency hopping spread spectrum (FHSS) radio system operating in the 2.4 GHz unlicensed band. Its low power transmissions allow a typical range of about 10 meters. Devices connect to each other to form a network known as a piconet, with up to seven active devices in the piconet. Bluetooth has a protocol stack to transfer data and implement the advanced features required by applications. The protocol stack consists of several different protocols designed for different purposes. The profiles, or applications, reside above the protocol stack. Bluetooth also has a lower protocol stack for link management and baseband control. Bluetooth hardware implementations are typically highly integrated systems consisting of one or two chips, such as a Radio IC and a Baseband IC.

The Bluetooth baseband chip consists of a processor core such as an ARM7 with integrated memories, Bluetooth baseband, and several other peripherals. The radio is implemented in a separate chip. The ARM7 processor runs all the required software including a lower stack, an upper stack, and an embedded profile. This type of single CPU implementation allows for a small, low power, low cost solution.

The software "stack" contemplates the insertion of useful applications in the higher layers of the stack. These applications can be designed to take advantage of Bluetooth's lower layers to implement functionality based on Bluetooth radio links.

Three low power modes are specified by Bluetooth, namely, sniff mode, hold mode and park mode. For sniff mode, in normal piconet operation, a device turns on its receiver for its assigned time slot. In sniff mode the device negotiates a regularly spaced interval such that it only needs to turn on its receiver on this interval. A typical sniff interval is 200-1000 milliseconds (ms). The device run may have a SCO (audio) connection open and exchange data over an ACL link. The device will stay in sniff mode until switched back to active mode. Hold mode is similar to sniff mode but on a one-time basis. During hold mode, the device will not receive packets for the hold interval but when the interval ends the device goes back to active mode. The device may have a SCO connection open. In park mode, the device is no longer an active member of the piconet. It periodically listens for beacon packets to maintain synchronization to the piconet. SCO connections are not opened and data is not exchanged on the ACL link. A device will stay in park mode until it is switched back to an active operating mode. One low power mode is possible on an ACL link between devices. In addition, when switching between modes the device first enters active mode. For example to switch from park to sniff the device switches from park to active to sniff. The present systems and methods relate in general to unique such that the control of the device and as such the data processing may transition from one device to another, depending on where and how the fraudulent attack is detected.

The preceding summary is provided for the purposes of summarizing some exemplary embodiments to provide a basic understanding of aspects of the subject matter described herein. Accordingly, the above-described features are merely examples and should not be construed as limiting in any way. Other features, aspects, and advantages of the subject matter described herein will become apparent from the following description of Figures and Claims.

Turning now to the figures, FIG. 1A depicts an illustrative block diagram 100 of a payment system 1 configured to allow acceptance and processing of secure payments, in accordance with some embodiments of the present disclosure. In some embodiments, a fraudulent actor may plant or otherwise associate a hardware or software bug (hereinafter referred to as unrecognized device 35) with the payment system 1, where the unrecognized device 35 is configured to interrupt or stop the secure payments, or create fraudulent payments that are not authorized by the parties that are buying or selling items or services. The disclosure here is based on the consideration that any system for the misappropriation of confidential information connected to the use of sensitive objects, such as payment cards, identification badges, etc., are able to read the information content of the magnetic stripe or microchip of the card itself by means of a reading device, which is appropriately placed near to the original one employed by the payment system 1. For this reason, the present disclosure provides systems and methods that check the conformity and the regularity of the operation of the payment terminal and the possible tampering therewith by detecting the possible presence, at the credit card reader, of apparatuses that are external and foreign to the original payment system, probably installed to misappropriate the confidential data of the users using the payment terminal so as to clone their cards and later use them in a fraudulent manner.

In one embodiment, the payment system 1 operates to measure a change in state of a reader in response to an association with an unauthorized device. The unauthorized device is likely to cause changes in operation, power levels, or structure. While some changes may be easier to detect, others may be hard. The system disclosed herein determines which parameters, RSSI strength, power levels, pressure, temperature, etc., are exhibiting change from a previous state, whether those changes are above a threshold to warrant additional analysis, and if so, determining the rules and tests to apply such that the previous state can be attributed to entry of an unauthorized device. The system then determines remedial measures in response to determination that the unauthorized device is or may be fraudulently tracking payment information.

In one embodiment, payment system 1 includes a payment instrument 10, payment terminal 15, network 30, and payment server 40. These components of payment system 1 facilitate electronic payment transactions between a merchant 11 and a customer 12. Even though the description here may use payment systems as an example, it would be understood that the systems and methods disclosed herein apply to any device that can be tampered with for data theft or other unauthorized actions. Further, the description here contemplates the unrecognized or unauthorized device as being planted in the payment reader, however, the problem identified here can manifest itself in any part of the payment system 1, such as the payment terminal 15, customer phone 10, and the like.

The electronic interactions between the merchant 11 and the customer 12 take place between the customer's payment instrument 10 and the merchant's payment terminal 15. The customer 12 has a payment instrument 10, such as a credit card having magnetic stripe, a credit card having a magnetic stripe, an EMV chip, or an NFC-enabled electronic device, such as a smart phone running a payment application 25. The merchant has a payment terminal 15 such as a payment terminal or other electronic device that is capable of processing payment information (e.g., encrypted payment card data and user authentication data) and transaction information (e.g., purchase amount and point-of-purchase information), such as a smart phone or tablet running a payment application.

In some embodiments (e.g., for low-value transactions or for payment transactions that are less than a payment limit indicated by a NFC or EMV payment instrument 10), the initial processing and approval of the payment transaction may be processed at payment terminal 15. In other embodiments, payment terminal 15 may communicate with payment server 40 over network 30. Although payment server 40 may be operated by a single entity, in one embodiment payment server 40 may include any suitable number of servers operated by any suitable entities, such as a payment service system and one or more banks of the merchant and customer, such as to a bank server 60. The payment terminal 15 and the payment server 40 communicate payment and transaction information to determine whether the transaction is authorized. For example, payment terminal 15 may provide encrypted payment data, user authentication data, purchase amount information, and point-of-purchase information to payment server 40 over network 30. Payment server 40 may determine whether the transaction is authorized based on this received information as well as information relating to customer or merchant accounts, and responds to payment terminal 15 over network 30 to indicate whether or not the payment transaction is authorized. Payment server 40 may also transmit additional information such as transaction identifiers to payment terminal 15. In on implementation, the payment server 40 includes a payment service system 50 and a bank server 60 collectively operating to permit or reject payment transactions. In some implementations, if the payment server 40 is offline with respect to the payment terminal 15, that is if the payment terminal 15 cannot establish a network connection with the payment server 40, the payment terminal 15 can provisionally authorize the transactions based on a risk heuristic model, which is configured to determine risk associated with an offline transaction based on past transactions.

Based on the information that is received at payment terminal 15 from payment server 40, the merchant 11 may indicate to the customer 12 whether the transaction has been approved. In some embodiments such as a chip card payment instrument, approval may be indicated at the payment terminal, for example, at a screen of a payment terminal. In other embodiments such as a smart phone or watch operating as a NFC payment instrument, information about the approved transaction and additional information (e.g., receipts, special offers, coupons, or loyalty program information) may be provided to the NFC payment instrument for display at a screen of the smart phone or watch or storage in memory.

In one implementation, the payment terminal 15 further includes a payment reader 5 and a POS terminal 15, such as a mobile device executing thereon a payment application 25. The payment application 25 can be an application that allows a merchant to view the inventory of items and services that they can then modify and for a customer to authorize purchases. In one implementation, the POS terminal 15 can be a POS terminal operated and managed by a merchant(s). Furthermore, the POS terminal 15 can be of a varied hardware and/or software configuration, such that POS terminal 15 may be an Android device or an iOS device. In another example, POS terminal 15 can be a cellphone or a tablet computer. The POS terminal 15 can be an electronic point-of-sale system that is connected to the payment reader 5, which is capable of accepting a variety of payment instruments, such as credit cards, debit card, gift cards, near-field communication (NFC) based payment instruments, and the like. The POS terminal 15 can also be an unattended terminal, such as an ATM machine or a vending machine.

The payment reader 5 may be a magnetic stripe card reader, optical scanner, smartcard (card with an embedded IC chip) reader (e.g., an EMV-compliant card reader or NFC enabled reader), radio frequency identification (RFID) reader, or the like, configured to detect and obtain data off any payment instrument. Accordingly, the payment reader 5 may include hardware implementation, such as slots, magnetic tracks, and rails with one or more sensors 17 or electrical contacts to facilitate detection and acceptance of a payment instrument 10. Additionally or optionally, the payment reader 5 may also include a biometric sensor to receive and process biometric characteristics and process them as payment instruments, given that such biometric characteristics are registered with the payment service system 50 and connected to a financial account with a bank server 60.

The payment reader 5 may be a portable reader that can be physically or wirelessly tethered to the POS terminal 15. The payment terminal 40 may also include other components, such as a printer 18, for printing out receipts, coupons, barcodes, quick-response ("QR") codes, or some combination thereof. The printer 18 may be a thermal printer, a direct thermal printer, a thermal transfer thermal printer, a solid-ink "phaser" printer, an inkjet printer, a thermal inkjet printer, a continuous inkjet printer, a piezoelectric inkjet printer, a dye-sublimation printer, a laser printer, an LED printer, or some combination thereof. The payment system 1 may also include a display 22, such as a touch-sensitive display, to receive touch inputs from a user, such as a merchant or customer. The display 22 may also indicate alerts, notifications, or other information pertaining to the payment system 1. For example, the display may be configured to show an alert to the merchant or customer to indicate that any of the units of the payment system 1 may be tampered with or that the transactions are executing in an unsafe mode. In some implementations, such an alert may be sent to the server 50, which can then apply remediation measures in response to the alert.

The reader 5, in general, or the transceiver therein (marked "T" in the figure), along with printer 18, display 22, the payment application 25, and the like, can connect with the POS terminal 15 or the payment reader 5 via a network connection, such as a Bluetooth®, or Bluetooth Low Energy® connection. For this, each of the printer 18, the POS terminal or the payment reader 5 may include a wireless transmitter and/or receiver to communicate with corresponding components of other devices. Similarly, the payment terminal 15, the payment reader 5, and other components within the payment system 1 may have a Bluetooth transmitter and/or receiver.

The wireless transmitter and/or receiver, such as a BLE transceiver (marked "T" in the figure), generally works on a master/slave model where the master device can be connected to a number of slave devices via a wireless network, such as a piconet. The master coordinates communication throughout the piconet. It can send data to any of its slaves and request data from them as well. Slaves are only allowed to transmit to and receive from their master. They can't talk to other slaves in the piconet. Every single Bluetooth device has a unique 48-bit address, commonly abbreviated BD_ADDR. This will usually be presented in the form of a 12-digit hexadecimal value. The most-significant half (24 bits) of the address is an organization unique identifier (OUI), which identifies the manufacturer. The lower 24-bits are the more unique part of the address. Creating a Bluetooth connection is generally a multi-step process involving progressive states, such as: Inquiry (process of discovering another device); Paging or connecting (process of forming a connection between two devices); and Connection (process for picking a mode after connection). In a connected state, the device can operate the Bluetooth transceiver in one of these modes: an "active mode" in which the device is actively transmitting or receiving data; a "sniff mode" in which the device is listening for transmissions at a set interval, e.g., every 100 milliseconds; a "hold mode" in which the device sleeps for a defined period of time and then returns back to active mode when that interval has passed, and the master can command a slave device to hold; and a "park mode" in which a master can command a slave to "park" and that slave may become inactive until woken up by the master.

The transceiver receives responses (e.g., reflection of the one or more signals, absorption of the one or more signals, refraction of the one or more signals, pass through of the one or more signals, angle of incident of the one or more signals, backscattering of the one or more signals, a response to the one or more signals, and magnetization induced by the one or more signals to produce measured signal effects), converts the responses to one or more digital signals, and provides the one or more digital signals to a processor of the reader or the terminal (not shown). The transceiver can be an ultrasound transceiver ultrasound transceiver that transmits one or more ultrasound signals within an ultrasound frequency band, a radio frequency (RF) transceiver that transmits one or more signals within a radio frequency band. In an embodiment, the transceiver is a microwave transceiver that transmits the one or more signals within a microwave frequency band. In an embodiment, the transceiver 32 is an infrared transceiver that transmits the one or more signals within an infrared frequency band. In an embodiment, the transceiver is a laser transceiver that transmits the one or more signals within a visible light frequency band. In an embodiment, the transceiver is a digital camera that utilizes ambient light as the one or more signals within the visible light frequency band. In an embodiment, the transceiver is an ultraviolet transceiver that transmits the one or more signals within an ultraviolet radiation frequency band. In an embodiment, the transceiver is an X-ray transceiver that transmits the one or more signals within an X-ray frequency band. In an embodiment, the transceiver is a magnetic source that transmits the one or more signals as one or more magnetic signals. In an embodiment, the transceiver may include one or more of the ultrasound transceiver, the RF transceiver, the microwave transceiver, the infrared transceiver, the laser transceiver, the digital camera, the ultraviolet transceiver, the X-ray transceiver, and the magnetic source transceiver. The one or more peripheral sensors, which may be a ultrasound transceiver, the RF transceiver, the microwave transceiver, the infrared transceiver, the laser transceiver, the digital camera, the ultraviolet transceiver, the X-ray transceiver, the magnetic source transceiver, an access point, a local positioning system transmitter, a local positioning system receiver, etc., transmits one or more signals and receives responses thereto that facilitate the determination of unauthorized devices/or their position and/or motion. The peripheral sensors may be enabled at the same time using different frequencies, different time slots, time-space encoding, frequency-spacing encoding or may enabled at different times in a round robin, poling, or token passing manner.

The subject matter described herein applies to scenarios where a fraudulent actor associated with an unauthorized computing device 45, such as a phone or laptop, associates or introduces an unauthorized device 35, such as hardware or software Trojan, card shimmer, or card skimmer, and the like, into the payment system 1, for example, in the payment reader 5 or the POS terminal 15. The actor may do so unbeknownst to the merchant, and with an intention to obtain access to sensitive information, such as credit card data. Such a parasitic device 45 may include a RF detection component to comprise wireless transceiver or receiver circuitry (labeled T) configured to support at least one RF communication technology and to capture wireless communications at the raw packet level for the specific technology. For example, the fraudulent actor can configure the RF component to capture or sniff wireless communications at the raw packet level for technologies, such as Bluetooth wireless technology, Wi-Fi (IEEE 802.11), Zigbee, IEEE 802.15.4, ISA 100.11a Standard for Wireless Industrial Networks, WirelessHART, Ultra-Wideband (UWB), Certified Wireless USB, WiMAX, WiBro, as well as any other desired wireless technology. In some embodiments, the sniffers may also be configured to perform some initial analysis of the captured data. By way of example and not limitation, sniffers may be configured to detect the location within a data packet of one or more specific parameters and then identify those locations, the specific parameters, or both. The sniffers may also be configured to intercept signals, such as pairing signals, data signals, etc., to obtain information that is otherwise shared confidentially between parties.

As mentioned above, the unauthorized device 35 may exist as a shimmer that sits between the chip on the card and the chip reader in the ATM or a POS system 1 recording the data on the chip as it is read by the underlying machine. Data collected by shimmers cannot be used to fabricate a chip-based card, but it could be used to clone a magnetic stripe card. Although the data that is typically stored on a card's magnetic stripe is replicated inside the chip on chip-enabled cards, the chip contains an additional security components not found on a magnetic stripe. One of those is a component known as an integrated circuit card verification value (iCVV)—also known as a "dynamic CVV." The iCVV differs from the card verification value (CVV) stored on the physical magnetic stripe, and protects against the copying of magnetic-stripe data from the chip and using that data to create counterfeit magnetic stripe cards.

In one implementation, the payment server 40 includes a payment processing system 50 and a bank server 60 collectively operating to permit or reject payment transactions. The payment processing system (PPS) 50 further includes a user interface 56, a database 65 that stores reader profiles 55, a state machine 75, a sniffing component 57, and a notification component 58. The PPS 50 can interface with other devices, such as the payment system 1, through respective wireless access points.

In one implementation, the state machine 75, in one implementation, stores the states of the reader or readers 5 associated with a merchant account or payment application 25 in a database 65, as a data structure hereinafter referred to as reader profile 55. The reader profile 55 corresponds to the identity of the reader 5, such as in terms of the number of transceivers, registration number of the reader 5, unique identifier, association of the reader 5 with a payment or merchant account, the association of the reader 5 with a mobile or POS terminal on which a payment application is executing and so on. The reader model or profile 55 can also correspond to the behavior or behaviors associated with the reader 5 and collected and analyzed over time, or even an explicit or desired behavior set at the time of registration. Examples of such behavior includes determination of territory in which the reader 5 operates and accordingly determine, the "movement" profile, for example the merchant may move the reader from one terminal to another terminal, may move the reader laterally or only in a certain direction, or may not move the reader at all, such "movement" behaviors can be stored in movement profiles. The reader profile 55 can also include the number of readers within a defined territory and placement of a reader with respect to other readers or terminals connected to a payment application. The state machine 45 checks the system 1 at predefined time intervals or at random time intervals to determine whether the state of the reader has deviated, above or below a threshold level, from the reader profile 55. If the state machine 45 identifies or is reported a deviation of behavior, the state machine 45 contacts the merchant through a communication identifier, e.g., email address, phone number, etc., stored in the payment server 40. The notification may indicate to the merchant that there is potentially a unauthorized device or new behavior, which may be a fraudulent attempt.

In one implementation, the state machine 45 can obtain reader profile through several ways. In one example, the state machine 45 obtains the reader profile by querying readers within a defined geographical boundary at random or predefined intervals. The queries are configured to obtain information related to power levels, signal strength, location, and other such parameters, that may indicate a behavior of a reader over time. The state machine 45 sends the queries to a list of readers or any reader within the proximity of a payment object reader that is broadcasting or is otherwise available on a communication protocol. The state machine 45 stores a reader profile including behavior at the time of registration of the reader and subsequent association of the reader to a payment application. The state machine 45 can also store the behavior of the reader 5 with respect to the POS terminal 15. In one implementation, the payment reader 5 includes device detection components (not shown) 17 including, but not limited to, sensors, detectors, radio frequency transmitters and/or receivers. By leveraging the sensing capabilities of these components, the POS terminal 15 can determine a state of the payment reader 5 at any time. The POS terminal 15 can set a geo-fence within which to track reader profiles. In actuality, some readers may be outside the actual store but within the geo-fence established by the POS terminal 15. In another implementation, the POS terminal 15 receives information from all computing devices irrespective of their distance from the POS terminal 15. In another implementation, the POS terminal 15 may query or target a specific reader within a geographical or logical fence or having a specific IMEI or MAC address, etc.

The present disclosure leverages on the fact that each reader profile is unique and any deviation owing to subtle differences introduced, for example due to a fraudster attempting to add a skimmer, is detectable and helps facilitate a bad actor to take control of the sensitive information.

The reader profile 55 can be based on performance characteristics for each reader. These characteristics are generally too subtle or negligible to be observable by a naked eye or be distinguished by a generic computer. For example, various design characteristics may impact the quality of the data services provided by reader and its ability to provide communications in varying radio environments, like the radio front-end of the mobile device, which drives, in part, the radiated performance (a devices ability to receive and transmit radio signals) of the device may positively or negatively impact the quality of communications in various radio environments. Another factor may be the device's capability to cancel interfering radio signals from wanted radio signals in order to reduce the signal-to-noise ratio and thereby improve the quality of communications. Other design factors include (a) the performance of the device's digital signal processor, (b) the design of the device's operating system and associated applications including the handling of TCP/IP communication. As a result, reader 5 may have varying performance characteristics due to their design. In other words, reader 5 operating in the same radio environment may provide different qualities of communication.

As suggested previously, wireless devices like reader 5 utilize radio waves to support communication over distance. The reader 5 transmits and receives information via the radio waves, which may be carried over predetermined frequency bands. An antenna connected to a transmitter and a receiver (labeled T), along with the associated circuitry, allows the reader 5 to transmit and receive these radio wave signals. The design of the wireless reader 5, including the antenna and the various transmit- and receiver-related components, impacts the ability of the reader 5 to transmit and receive radio wave signals, and hence defines and affects the radiated performance of the device, which as mentioned in the previous paragraph can be measured to differentiate one device from another. Some of the methods are described hereinafter.

In one implementation, the POS terminal 15 extracts or reads specific characteristics, e.g., physical, radio, magnetic, wireless, and the like, from the reader 5. For example, the POS terminal 15 obtains radio fingerprints of the reader 5 by allowing its radio frequency transmitter and receiver to interact with the respective antenna transmitter and receiver of the reader 5, for example on a specific or selected frequency bands. It is assumed that the reader 5 is operating over a wide range of radio frequencies and output power levels. The cellular telephone devices, which are now common, for example, operate in the 800-900 MHz or 1700-1900 MHz range and at power levels of about 600 mW while blue tooth devices operate in the 2.4 GHz range at significantly lower power levels. The reader 5 may send signals to the POS terminal 15 and vice versa on the frequency and at the power levels understood by devices 108, where the responses to the signals from the reader 5 help identify and generate a profile of the reader 5 to a reasonable accuracy. The signals are within Specific Absorption Rate (SAR) limitations. In some implementations, the reader 5 provides radio fingerprints in the form of transmission and reception measurements of the reader 5. The transceiver of the POS terminal 15 may obtain transmission measurements for example, among other things a measurement of the phase error, of the frequency error, of the power and of the spectrum, RSSI, RSSI vs. frequency measurements. In reception measurements, bit error rates may be measured. In one implementation, the reader 5 and/or the POS terminal 15 may include additional components, e.g., antenna elements, diplexers, antenna coupler, and the like, to facilitate or obtain more accurate measurements.

In another example, the radio fingerprints correspond to radiated performance characteristics, such as Effective Isotropic Radiated Power ("EIRP"), receiver sensitivity, Total Radiated Power ("TRP"), Total Isotropic Sensitivity ("TIS"), and envelope correlation, which is related to receiver diversity performance. These characteristics are also unique to a reader and its positive with respect to a POS terminal 15 given their design differences, given that all other signal propagation factors, such as propagation paths, physical environment, and the like remaining same. This is because in a wireless communication system, an RF modulated signal from a transmitter may reach a receiver via a number of propagation paths. The characteristics of the propagation paths typically vary over time due to a number of factors such as fading and multipath. Further, structures such as buildings, and surrounding terrain, including walls, contribute to the scattering and reflection of the transmitted signal. The scattering and reflection of the transmit signal results in multiple signal paths from the transmitter to the receiver. The contributors to the multiple signal paths change as the receiver moves. Other signal sources also contribute to the degradation of the desired signal. The other signal sources may be other transmitters intentionally operating on the same frequency as the desired signal, as well as transmitters that generate spurious signals in the frequency band of the desired signal. Yet another source of signal degradation may be generated within the receiver itself. Signal amplifiers and signal processing stages within the receiver may degrade the level of the desired signal with respect to the level of thermal noise. The signal amplifiers and processors within the receiver may also generate noise products or distort the received signal and further degrade its quality. The calculated value of the radiated performance characteristics, based on measurements described herein, may then be stored for future detection of the wireless device. At a future time, the radiated performance characteristics are compared to the stored values, in order to determine a radiated performance approval and/or certification of the wireless device.

Such radio fingerprints are likely to change if there is an intruder, such as the unauthorized device 35. The radio fingerprints can be detected either by the transceiver of the card reader or the POS terminal or another device configured for such detection.

Both during the tracking, detection and registration of the reader 5, the reader 5 may be placed in an anechoic chamber to provide RF isolation from the external environment and allow for the execution of detection of the reader 5 on the same frequency channels as used during the time of device registration.

Besides or in addition to radio fingerprints mentioned above, the payment reader 5 provides its profile through the wireless transmitter and receiver and over Wi-Fi or Bluetooth communication protocols. In one implementation, the transmitter of the POS terminal 15 obtains the fingerprints from the reader 5 by transmitting and receiving command and control parameters to and from the reader 5. The command and control parameters place the reader 5 in a detect mode and determine the quality and operations of a radio frequency (RF) link established between the wireless device and the base station. The wireless data communications link is also used to transmit command and control parameters from the wireless device to the base station. The quality of the RF link is stored in a database as wireless fingerprint of the device. At a future instance, the device 5 can be detected by re-establishing an RF link and determining the quality to be similar to one of the stored values, where each value corresponds to a unique device. In some implementations, the uplink and/or downlink data speed through the RF link may be used as parameters to detect a reader 5 from amongst other devices.

In another implementation, the reader 5 measures or provides the manufacturing or engineering tolerances of the sub-components embedded in the reader 5 and how they change with the intrusion of an unauthorized device. For example, the payment object reader 5 can measure the performance of microphone, accelerometer or other such sensors 17. In another example, the reader 5 can measure the defects or anomalies in a particular device that are unique to the device.

In another implementation, the POS terminal 15 is configured to detect any open communication ports in the reader 5 and generate, on-the-fly for example, schemes to communicate detection sequences to the reader 5. The schemes are configured based on a communication protocol corresponding to the open port. The POS terminal 15 also tracks the movement of the reader and stores such behavior in the reader profile. For example, through accelerometers or antennas, the POS terminal 15 can track, over time, the movement behavior of the reader 5. Thus, the behavior indicates that the reader moves within a certain geo-fence or stays stable on certain days, times, or months. For example, in one scenario, the unauthorized device 35 can create or use (otherwise un-used) ports for transmitting sniffed information. Accordingly, the reader profile can be update based on which ports open and close and at what time and corresponding to which events so that the fraud detection component 57 can return a change of state and accordingly, a high level of risk with the current transactions. This is discussed subsequently.

After obtaining the reader profile or behaviors such as information related to the radiated performance, defects, manufacturing or engineering tolerances, etc., the reader 5 or the POS terminal 15 stores such behavioral or fingerprint data for future use such as detection and tracking of the reader movement. The reader 5 may store such data locally within the reader or in a connected device, such as a POS terminal 15, or remotely in a server, such as a payment server 40. The POS terminal 15 also facilitates storage of the reader behavior or profile and maps the reader and terminal information to the merchant via payment application so as to create a relationship between the payment application and the reader. Such relationships may be saved in various formats, such as charts, semantic maps, taxonomies, trees, and the like, and are also saved in reader profiles 55.

In one implementation, the system 100 works as follows. A fraudulent actor 3 may place an unauthorized device 35, such as an illicit skimmer having a wireless transmitter T, into one of the components in the payment system 1, such as the card reader 5. The unauthorized device 35 is capable of transmitting the sniffed data to its paired device 45 for fraudulent processing of transactions.

In one implementation, the card reader 5, through its sensors 17 or transmitters detects presence of the illicit skimmer 35. To this end, the card reader 5 can generate messages on its display for the merchant to move the reader 5 in a certain direction or place the reader in a certain orientation. The sensors then measure values of certain parameters, such as RSSI strengths, in response to changing directions. The change in direction can be monitored via accelerator within the reader 5, such that different values correspond to different directions.

In another implementation, the POS terminal 15, or another device, determines the value of certain parameters corresponding to all transceivers in proximity to the POS terminal 15. For this, the POS terminal 15 implements the sensors 17 within to detect the transceivers and measure signal strengths corresponding to the proximate transceivers. The change in values can also correspond to a change in states.

If payment reader 5 or any other reader connected to the POS terminal 15 changes state with respect to a current state, the server 40 generates a notification, e.g., via the state machine 75, to indicate to the merchant that an anomaly has occurred. In one implementation, any current transactions may be paused until the merchant has verified the state of all readers, or if the server indicates presence of an unknown reader in proximity to the POS terminal 15. In this manner, the server 40 indicates states with respect to readers that are not just connected to the POS terminal 15 but are also within a certain territory. It will be understood that location or reader identity is used as example only, the server can also determine change of state in the context of change in power levels, location, or other such measureable value.

In yet another implementation, the merchant uses the registration application 25 to register the payment reader 5 with an account association with the registration application 25, for example at the time of pairing or bonding the payment reader 5 with the POS terminal 15. While making such registration, specific attributes of the components within the reader 5 can also be registered with the server 40. The server 40 can store such relationships between the payment reader 5 and the POS terminal 15 either locally or within the server 40 in specific data structures. In case of multiple readers, similar to payment reader 5, being connected to the POS terminal 15, the server 40 can also store the hierarchy of readers, the identity of such readers, profile of the readers, and location of the readers with respect to the POS terminal, among other things.

When a reader whose device fingerprints or reader profile 55 enters the geo-fence of a merchant location, the POS terminal 15 determines a unauthorized device profile based on the entry of a reader with new components, such as unauthorized transceivers, and compares whether the unauthorized device profile matches with the existing reader profile, or whether the unauthorized device profile is connected with the merchant application different from existing merchant application, or otherwise connected to components that are unidentified. If the terminal 15 identifies the reader profile and no deviation is determined as per threshold, the terminal 15 processes the transaction. However, if there is a substantial deviation with respect to the threshold after comparison of reader profiles, the terminal 15 temporarily pauses the payment transaction processes until the merchant has confirmed that the unauthorized device belongs to them. For this, the server 40 contacts the merchant by accessing a merchant profile. The merchant profile includes one or more of: an identifier identifying the merchant (e.g., a name, a number, an alphanumeric identification/code, etc.); contact information associated with the merchant (e.g., a phone number, a mailing address, a physical address, an email address, a fax number, etc.); In this manner, a fraudster cannot add components as the present subject matter detects added components by tracking variation in reader profiles as unauthorized devices either enters, leaves or otherwise moves with respect to the POS terminal 15 thereby presenting a different behavior. The check of the regularity of the payment terminal can be carried out by the device either upstream of the normal operative step or during the step itself, in a dynamic and non-static manner.

Figure 1B:
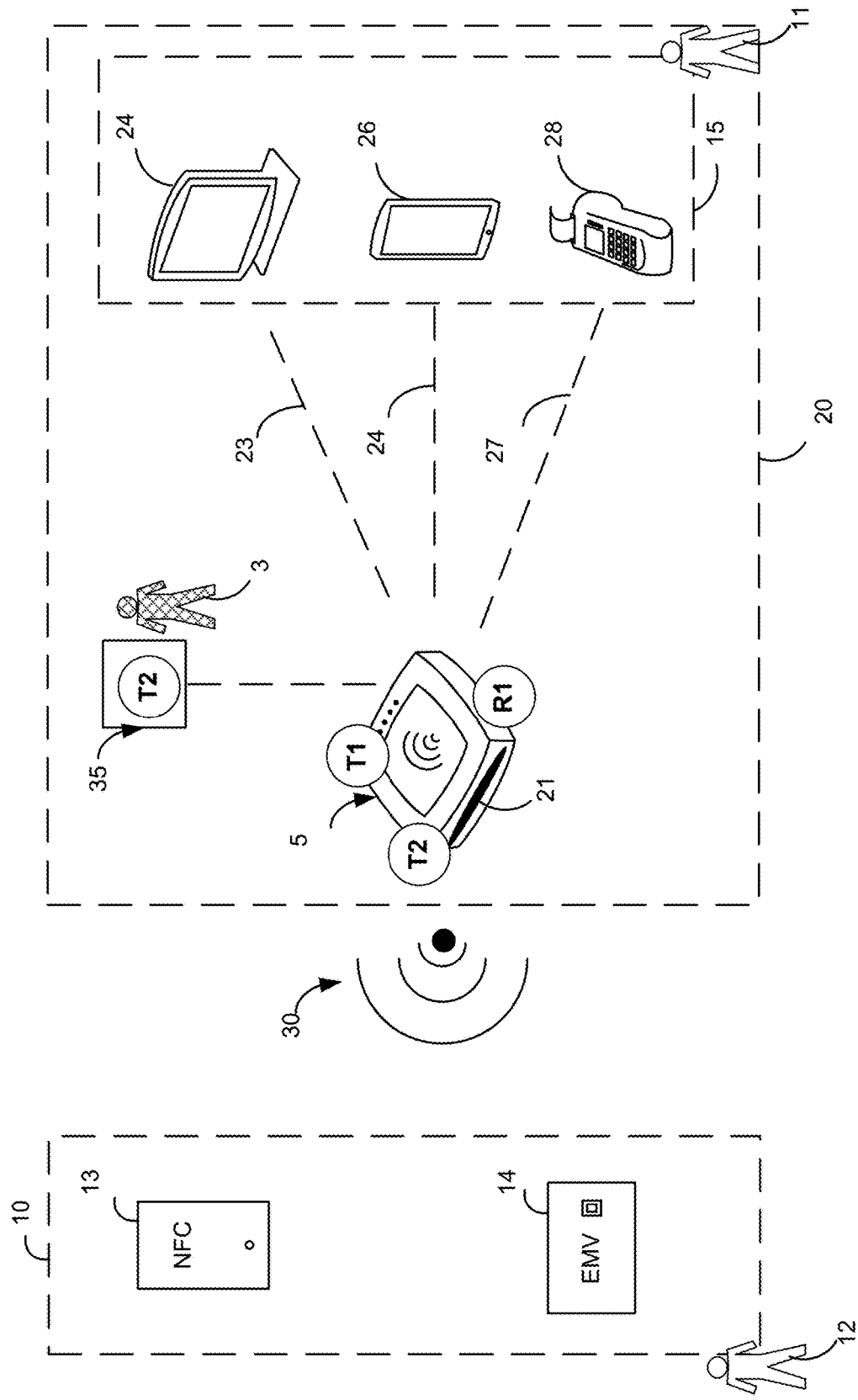
FIG. 1B depicts an illustrative block diagram of a payment reader and payment terminal in accordance with some embodiments of the present disclosure.

FIG. 1B depicts an illustrative block diagram of payment instrument 10 and payment terminal 15 in accordance with some embodiments of the present disclosure. Although it will be understood that payment instrument 10 and payment terminal 15 of payment system 1 may be implemented in any suitable manner, in one embodiment the payment terminal 15 may comprise a payment reader 5 and a POS terminal 15. However, it will be understood that as used herein, the term payment terminal may refer to any suitable component of the payment terminal, such as payment reader 5. In an embodiment, the payment reader 5 of payment terminal 15 may be a wireless communication device that facilitates transactions between the payment instrument 10 and a POS terminal 15 running a point-of-sale application 25.

In one embodiment, payment instrument 10 may be a device that is capable of communicating with payment terminal 15 (e.g., via payment reader 5), such as a NFC device 13 or an EMV chip card 14. Chip card 14 may include a secure integrated circuit that is capable of communicating with a payment terminal such as payment terminal 15, generating encrypted payment information, and providing the encrypted payment information as well as other payment or transaction information (e.g., transaction limits for payments that are processed locally) in accordance with one or more electronic payment standards such as those promulgated by EMVCo. Chip card 14 may include contact pins for communicating with payment reader 5 (e.g., in accordance with ISO 7816) and in some embodiments, may be inductively coupled to payment reader 5 via a near field 30. A chip card 14 that is inductively coupled to payment reader 5 may communicate with payment reader 5 using load modulation of a wireless carrier signal that is provided by payment reader 5 in accordance with a wireless communication standard such as ISO 14443.

NFC device 13 may be an electronic device such as a smart phone, tablet, or smart watch that is capable of engaging in secure transactions with payment terminal 15 (e.g., via communications with payment reader 5). NFC device 13 may have hardware (e.g., a secure element including hardware and executable code) and/or software (e.g., executable code operating on a processor in accordance with a host card emulation routine) for performing secure transaction functions. During a payment transaction NFC device 13 may be inductively coupled to payment reader 5 via near field 13 and may communicate with payment terminal 15 by active or passive load modulation of a wireless carrier signal provided by payment reader 5 in accordance with one or more wireless communication standards such as ISO 14443 and ISO 13092.

Figure 2:
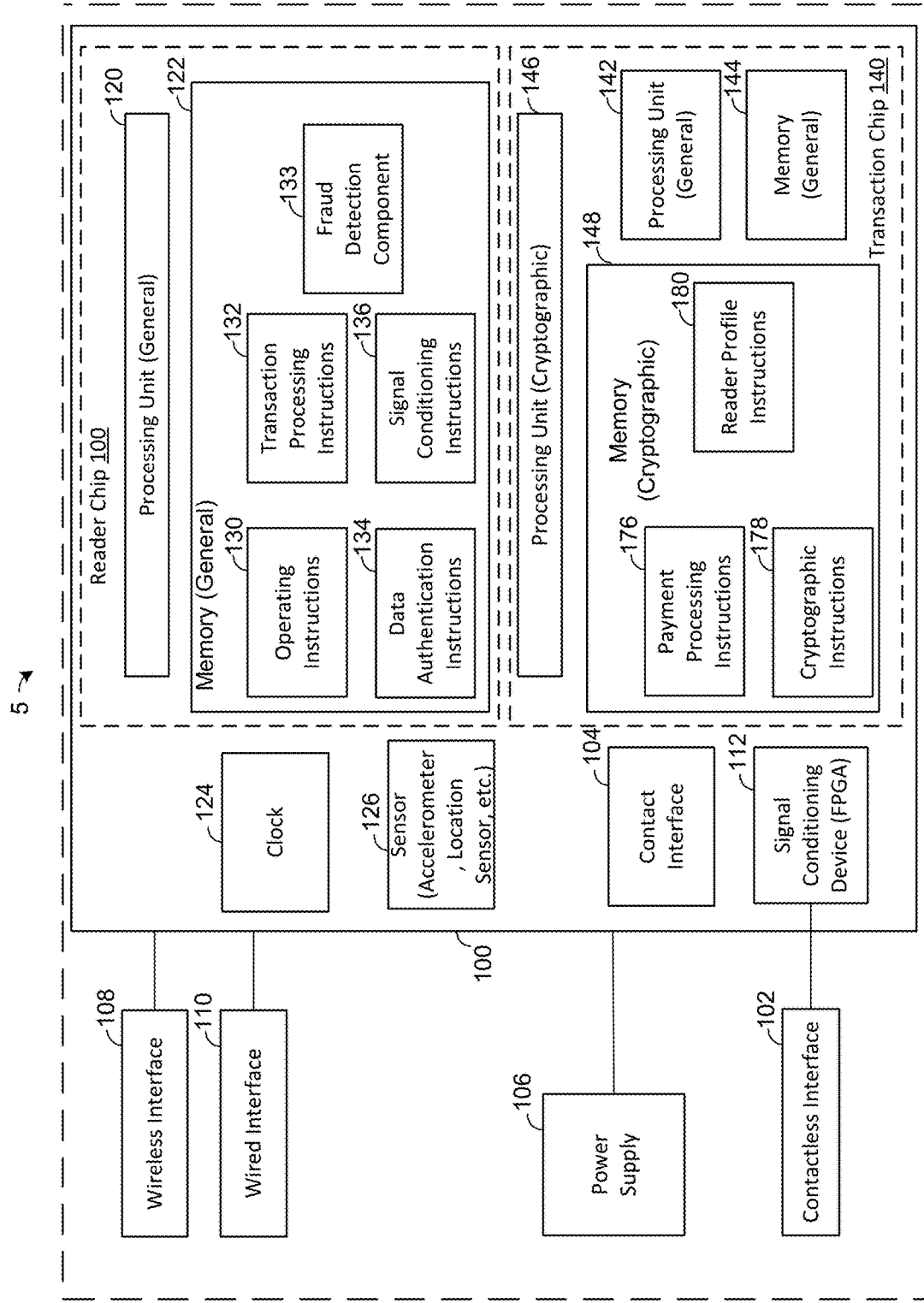
FIG. 2 depicts an illustrative block diagram of a payment reader in accordance with some embodiments of the present disclosure.

Although payment terminal 15 may be implemented in any suitable manner, in one embodiment payment terminal 15 may include a payment reader 5 and a POS terminal 15. The POS terminal 15 runs a point-of-sale application (shown in FIG. 1 as payment application 25) that provides a user interface for the merchant 3 and facilitates communication with the payment reader 5 and the payment server 40. Payment reader 5 may facilitate communications between payment instrument 10 and POS terminal 15. As described herein, a payment instrument 10 such as NFC device 13 or chip card 14 may communicate with payment reader 5 via, for example, inductive coupling. This is depicted in FIG. 2 as near field 12, which comprises a wireless carrier signal having a suitable frequency (e.g., 13.56 MHz) emitted from payment reader 5.

In one embodiment, payment instrument 10 may be a contactless payment instrument such as NFC device 13 or chip card 14, and payment reader 5 and the contactless payment instrument 10 may communicate by modulating the wireless carrier signal within near field 12. In order to communicate information to payment instrument 10, payment reader 5 changes the amplitude and/or phase of the wireless carrier signal based on data to be transmitted from payment reader 5, resulting in a wireless data signal that is transmitted to the payment instrument. This signal is transmitted by an antenna of payment reader 5 that is tuned to transmit at 13.56 MHz, and if the payment instrument 10 also has a suitably tuned antenna within the range of the near field 12 (e.g., about 0 to 10 cm), the payment instrument receives the wireless carrier signal or wireless data signal that is transmitted by payment reader 5. In the case of a wireless data signal, processing circuitry of the payment instrument 10 is able to demodulate the received signal and process the data that is received from payment reader 5.

When a contactless payment instrument such as payment instrument 10 is within the range of the near field 12, it is inductively coupled to the payment reader 5. Thus, the payment instrument 10 is also capable of modulating the wireless carrier signal via active or passive load modulation. By changing the tuning characteristics of the antenna of payment instrument 10 (e.g. by selectively switching a parallel load into the antenna circuit based on modulated data to be transmitted) the wireless carrier signal is modified at both the payment instrument 10 and payment reader 5, resulting in a modulated wireless carrier signal. In this manner, the payment instrument is capable of sending modulated data to payment reader 5. Furthermore, the payment reader 5 and the POS terminal 15 interact through one or more communication ports and via communication protocols to exchange and generate a reader profile based on behavior, such as motion tracking, of the reader 5 with respect to the POS terminal 15. Such reader profiles are associated with the payment application executing on the POS terminal 15.

In some embodiments, payment reader 5 also includes an EMV slot 21 that is capable of receiving chip card 14. Chip card 14 may have contacts that engage with corresponding contacts of payment reader 5 when chip card 14 is inserted into EMV slot 21. Payment reader 5 provides power to an EMV chip of chip card 14 through these contacts and payment reader 5 and chip card 14 communicate through a communication path established by the contacts.

Payment reader 5 may also include hardware for interfacing with a magnetic strip card (not depicted in FIG. 2). In some embodiments, the hardware may include a slot that guides a customer 7 to swipe or dip the magnetized strip of the magnetic strip card such that a magnetic strip reader can receive payment information from the magnetic strip card. The received payment information is then processed by the payment reader 5.

POS terminal 15 may be any suitable device such as tablet payment instrument 24, mobile payment instrument 26, or payment terminal 28. In the case of a computing device such as tablet payment instrument 24 or mobile payment instrument 26, a point-of-sale application may provide for the entry of purchase and payment information, interaction with a customer 7, and communications with a payment server 40. For example, a payment application may provide a menu of services that a merchant 3 is able to select and a series of menus or screens for automating a transaction. A payment application may also facilitate the entry of customer authentication information such as signatures, PIN numbers, or biometric information. Similar functionality may also be provided on a dedicated payment terminal 28.

POS terminal 15 may be in communication with payment reader 5 via a communication path 23/24/27. Although communication path 23/24/27 may be implemented via a wired (e.g., Ethernet, USB, FireWire, Lightning) or wireless (e.g., Wi-Fi, Bluetooth, NFC, or ZigBee) connection, in one embodiment payment reader 5 may communicate with the POS terminal 15 via a Bluetooth low energy (BLE) interface, such that the payment reader 5 and the POS terminal 15 are connected devices. In some embodiments processing of the payment transaction may occur locally on payment reader 5 and POS terminal 15, for example, when a transaction amount is small or there is no connectivity to the payment server 40. In other embodiments, POS terminal 15 or payment reader 5 may communicate with payment server 40 via a public or dedicated communication network 30. Although communication network 30 may be any suitable communication network, in one embodiment communication network 30 may be the internet and payment and transaction information may be communicated between payment terminal 15 and payment server 40 in an encrypted format such by a transport layer security (TLS) or secure sockets layer (SSL) protocol.

According to one implementation, a fraudster 3 walks into the merchant location, defined by the boundaries of the payment system 20, with an intention to introduce a hardware or software Trojan having transmitter/receiver/transceiver T2 into the legitimate reader R1 (having BLE transceiver T1) to charge the customer with a fraudulent amount either during or after the sale at a merchant location. The Trojan T2 may be introduced as part of an unauthorized device 35, such as fraudulent card reading device, a fraudulent keypad input intercepting device, a cash outlet trap device, a deposit input diversion device, or other illegitimate devices, The unauthorized card reading device can be installed externally of the machine, for example adjacent to the card reader slot of the machine fascia. Fraudsters are sometimes ingenious and in the past some have produced reading devices that can intercept magnetic stripe data or EMV data on cards that are being input to a machine by a consumer. By intercepting this data, fraudulent actors may be able to conduct unauthorized transactions with the customer's card number. Such external reading devices may be made to appear to be a part of the normal machine fascia. In some implementations, such Trojans may be planted inside the reader, such as adjacent to the original wireless transceiver T1 of the reader.

It will be understood that the boundaries may be wider, narrower or otherwise different from the payment system 20. However, as described in the present subject matter, a new Trojan T2 triggers the POS terminal 15 or the payment system 20 to review the state via the reader profile. In another example, measurement of signal strength from T1 and T2 with respect a common point (with respect to each other) or a reference point (another transceiver, such as that of a POS terminal 15) indicates whether or not the reader profile has changed. For example, on detecting two transceivers, another test if performed to determine if the signal strength of T1 and T2 changes when the reader is re-located with respect to the POS terminal 15, the lack of change triggers the reader profile to change above or below a certain threshold. The presence of the new transceiver T2 in close proximity to T1 and similar signal strength indicates that an unauthorized transceiver may be fraudulently tracking data exchange. This triggers creation of a unauthorized device profile, which is different from the original reader profile. As such, the payment server 40 or the POS terminal 15 sends notification to this effect indicating the merchant 3 that an unauthorized reader has either entered or removed from the territory thus exhibiting deviation from an established and stored reader behavior. The merchant 3 can then re-evaluate the state of readers R1 to determine whether the reader has been tampered with and halt transactions until a resolution has reached.

FIG. 2 depicts a block diagram of an exemplary payment reader 5 in accordance with some embodiments of the present disclosure. In one embodiment, payment reader 5 may be a wireless communication device that communicates wirelessly with an interactive electronic device such as a POS terminal 15, for example, using BLE. Although particular components are depicted in a particular arrangement in FIG. 2, it will be understood that payment reader 5 may include additional components, one or more of the components depicted in FIG. 2 may not be included in payment reader 5, and the components of payment reader 5 may be rearranged in any suitable manner. In one embodiment, payment reader 5 includes a reader chip 100, a plurality of payment interfaces (e.g., a contactless interface 102 and a contact interface 104), a power supply 106, a wireless communication interface 108, a wired interface 110, a user interface 112, and a transaction chip 140. Reader chip 100 of payment reader 5 includes a processing unit 120 and memory 122. Transaction chip 140 of payment reader 5 includes a general processing unit 142, cryptographic processing unit 146, general memory 144, and cryptographic memory 148. Although in one embodiment the processing units and memories will be described as packaged in a reader chip 100 and transaction chip 140 respectively, and configured in a particular manner, it will be understood that processing unit 120, general processing unit 142, cryptographic processing unit 146, memory 122, general memory 144, and cryptographic memory 148 may be configured in any suitable manner to perform the functionality of the payment reader 5 as is described herein. It will also be understood that the functionality of reader chip 100 and transaction chip 140 may be embodied in a single chip or a plurality of chips, each including any suitable combination of processing units and memory to collectively perform the functionalities of reader chip 100 and transaction chip 140 as described herein.

In some embodiments, reader chip 100 may be any suitable chip, such as a K21 chip supplied by Freescale Semiconductor, Inc. Processing unit 120 of reader chip 100 of payment reader 5 may be any suitable processor and may include any suitable hardware, software, memory, and circuitry as is necessary to perform and control the functions of payment reader 5. Processing unit 120 may include any suitable number of processors, and may perform the operations of reader chip 100 based on instructions in any suitable number of memories and memory types. In some embodiments, processing unit 120 may have multiple independent processing units, for example a multi-core processor or other suitable component. Processing unit 120 may execute instructions stored in memory 122 of reader chip 100 to control the operations and processing of payment reader 5. As used herein, a processor or processing unit may include one or more processors having processing capability necessary to perform the processing functions described herein, including but not limited to hardware logic (e.g., hardware designed by software that that describes the configuration of hardware, such as hardware description language (HDL) software), computer readable instructions running on a processor, or any suitable combination thereof. A processor may run software to perform the operations described herein, including software accessed in machine readable form on a tangible non-transitory computer readable storage medium.

In an exemplary embodiment, the processing unit 120 of reader chip 100 may operate as a hub for controlling operations of the various components of payment reader 5, based on instructions stored in memory 122. As used herein, memory may refer to any suitable tangible or non-transitory storage medium. Examples of tangible (or non-transitory) storage medium include disks, thumb drives, and memory, etc., but does not include propagated signals. Tangible computer readable storage medium include volatile and non-volatile, removable and non-removable media, such as computer readable instructions, data structures, program modules or other data. Examples of such media include RAM, ROM, EPROM, EEPROM, SRAM, flash memory, disks or optical storage, magnetic storage, or any other non-transitory medium that stores information that is accessed by a processor or computing device.

Reader chip 100 may also include additional circuitry such as interface circuitry, analog front end circuitry, security circuitry, and monitoring component circuitry. In one embodiment, interface circuitry may include circuitry for interfacing with a wireless communication interface 108, circuitry for interfacing with a wired interface 110 (e.g., USB, Ethernet, FireWire, and Lightning), circuitry for interfacing with other communication interfaces or buses (e.g., I²C, SPI, UART, and GPIO), and circuitry for interfacing with a power supply 106 (e.g., power management circuitry, power conversion circuitry, rectifiers, and battery charging circuitry).

Transaction chip 140 may include one or more processors having processing capability necessary to perform the processing functions described herein, including but not limited to hardware logic, computer readable instructions running on a processor, or any suitable combination thereof. In an exemplary embodiment, transaction chip 140 may include two RISC processors and may perform functionality relating to processing of payment transactions, interfacing with payment instruments, cryptography, and other payment-specific functionality. In some embodiments, transaction chip 140 may include a general processing unit 142 for executing instructions associated with general payment functionality and a cryptographic processing unit 146 for handling cryptographic processing operations. Each of general processing unit 142 and cryptographic processing unit 146 may have dedicated memory associated therewith (i.e., general memory 144 and cryptographic memory 148). In this manner, specific cryptographic processing and critical security information (e.g., cryptographic keys, passwords, user information, etc.), may be isolated from other circuitry of transaction chip 140 and securely stored and processed by cryptographic processing unit 146 and stored at cryptographic memory 148.

One or both of general processing unit 142 and cryptographic processing unit 146 of transaction chip 140 may communicate with reader chip 100 (e.g., processing unit 120), for example, using any suitable internal bus and communication technique. In this manner, reader chip 100 and transaction chip 140 can collectively process transactions and communicate information regarding processed transactions (e.g., with POS terminal 15).

Transaction chip 140 may also include circuitry for interfacing with a contact interface 104 (e.g., power and communication circuitry for directly interfacing with an EMV chip of a chip card 14 that is inserted in slot 21). In some embodiments, transaction chip 140 may also include analog front-end circuitry for interfacing with the analog components of contactless interface 102 (e.g., electromagnetic compatibility (EMC) circuitry, matching circuits, modulation circuitry, and measurement circuitry).

In some embodiments, general processing unit 142 may include any suitable processor for performing the payment processing functionality of payment reader 5 described herein. In some embodiments, general memory 144 may be any suitable memory (e.g., as described herein), and may include a plurality of sets of instructions for performing general transaction processing operations of payment reader 5, such as transaction processing instructions, data authentication instructions, and signal conditioning instructions, any of which may be implemented entirely or partially in firmware stored at memory 144.

Transaction processing instructions may include instructions for controlling any suitable general transaction processing operations of the payment reader 5, such as controlling the interaction between the payment reader 5 and a payment instrument 10 (e.g., for interfacing with a payment instrument 10 via the contactless interface 102 and contact interface 104), selecting payment processing procedures (e.g., based on a payment processing entity associated with a payment method), interfacing with the cryptographic processor 146, and any other suitable aspects of transaction processing. Data authentication instructions 134 may include instructions for providing configuration information for a payment terminal 15. The configuration information may include any suitable information, such as payment limits and types of transactions for local transactions (i.e., transactions that occur without contacting a payment server 40) and supported applications. As an example, in some embodiments, data authentication instructions 168 may include configuration instructions such as TMS-CAPK instructions. In some embodiments, the TMS-CAPK may be tailored for a particular jurisdiction (e.g., country-specific). Signal conditioning instructions 136 may include instructions for interacting with a contactless interface and signal conditioning circuitry for the contactless interface, including instructions for conditioning signals received from a payment instrument 10 via the contactless interface 102 (e.g., from a NFC payment instrument 10). Signal conditioning instructions 136 may include instructions for conditioning signals using any suitable hardware, logic, or algorithm required to process NFC signals received via contactless interface 102. The fraud detection component 133 may include rules and instructions to determine whether a parasitic device, such as an unauthorized device 35 or a transceiver associated therewith, are fraudulently placed, when they may have been placed and how to and what remedial actions to take once such detection is performed. The fraud detection component 133 may send specific instructions to the sensors, such as engage certain sensors and components, to make the detection. For example, the fraud detection component 133 may engage the display to indicate the merchant to position the reader in specified orientations, the accelerometer to detect movement and match merchant's movement to the specified orientations, and then the signal sensors to detect the RSSI signal strength (or emitted power levels) of the transceivers T1 and T2 as the reader is moved. The fraud detection component 133 may also engage a POS application for such purposes, i.e., to display instructions or to even engage the components, such as transceiver or signal strength monitor, of the POS terminal 15 to perform or cooperate with the fraud detection. If the signal strength remains unchanged, mostly unchanged in at least one orientation, or changes within a threshold, the fraud detection component may suspend all transactions, or send warning messages to the merchant indicating a high likelihood of tamper/intrusion of unauthorized device. In some instances, such devices may be authorized by the merchant, in which case, the merchant can authorize the device following a set of instructions as per the data authentication instructions. In some cases, the fraud detection component makes a real-time determination of what sensors to use, and what devices (reader or the terminal or a combination thereof) to use for efficient detection of an unauthorized device. Furthermore, the threshold of change may be dependent on the merchant device, location, environment, and form factor of the device itself. For example, for smaller devices, the threshold may be kept low, i.e., within 5%, as the transmitters may be close to each other and changes may be more subtle.

Cryptographic processing unit 146 may be any suitable a processor as described herein, and, in some embodiments, may perform cryptographic functions for the processing of payment transactions. For example, in some embodiments a cryptographic processing unit 146 may encrypt and decrypt data based on one or more encryption keys, in a manner that isolates the encryption functionality from other components of payment reader 5 and protects the encryption keys from being exposed to other components of payment reader 5.

In some embodiments, cryptographic memory 128 may be any suitable memory or combination thereof as described herein, and may include a plurality of sets of instructions for performing cryptographic operations, such as payment processing instructions and cryptographic instructions. Payment processing instructions may include instructions for performing aspects of payment processing, such as providing for encryption techniques to be used in association with particular payment procedures, accessing account and processing information, any other suitable payment processing functionality, or any suitable combination thereof. Cryptographic instructions may include instructions for performing cryptographic operations. Cryptographic processing unit 146 may execute the cryptographic instructions to perform a variety of cryptographic functions, such as to encrypt, decrypt, sign, or verify a signature upon payment and transaction information as part of a payment transaction. In some embodiments, cryptographic memory 148 may be any suitable memory (e.g., as described herein), and may include a plurality of sets of instructions for performing operations of payment reader 5, such as reader profile instructions 180, any of which may be implemented entirely or partially in firmware stored at memory 148.

The reader profile instructions 180 may include instructions for communicating with the payment terminal 15 and payment server 40 to provide information related to characteristics, such as location, signal strength, power levels, radiation levels, and the like, to the payment terminal 15 and server 40. The reader profile instructions 180, in some implementations, can also be received as payload/detection sequences from the terminal 20 or server 40 either randomly or at predefined time intervals. The execution of the reader profile instructions 180 causes collection of reader characteristics, including behavioral characteristics such as geographic locations where the merchant carries the reader, the reader that the merchant uses to sell categories of items, the time of day the readers are active, the average amount spent by the buyers in certain merchant categories, the average time the merchant spends in interacting with the reader, and so forth. The configuration information may include any suitable information, such as payment limits and types of transactions for local transactions (i.e., transactions that occur without contacting a payment server 40) and supported applications.

Wireless communication interface 108 may include any suitable wireless communications hardware (e.g., antennas, matching circuitry, etc.) and one or more processors having processing capability necessary to engage in wireless communication (e.g., with a POS terminal 15 via a protocol such as BLE) and control associated circuitry, including but not limited to hardware logic, computer readable instructions running on a processor, or any suitable combination thereof. Although wireless communication interface 108 may be implemented in any suitable manner, in an exemplary embodiment, wireless communication interface 108 may be implemented as a Texas Instruments CC2640 device, which may include a processing unit 130 and memory 132. Although in one embodiment, the processing unit 130 and memory 132 will be described as packaged in a wireless communication interface 108 and configured in a particular manner, it will be understood that processing unit 130 and memory 132 may be configured in any suitable manner to perform the functionality of the wireless communication interface 108 as is described herein.

Processing unit 130 may include any suitable processor or processing hardware for performing the functionality of wireless interface 108 as described herein. In some embodiment, processing unit 130 may execute the instructions of memory 132 to interact with and control hardware and other components of the wireless communication interface 108 in order to transmit and receive wireless communications (e.g., via BLE) and to communicate with other circuitry (e.g., processing unit 120 of reader chip 100) of payment reader 5 (e.g., using an internal bus or any other suitable communication method). Memory 132 is memory, as described herein, and may include wireless instructions for performing the processing operations of wireless communication interface 108. In some embodiments, memory 132 may be implemented as static random-access memory (SRAM), but any suitable memory format may be used to carry out the functionality of payment reader 5 as described herein. Wireless instructions 132 may include instructions for interacting with processing unit 120 of reader chip 100, in order to perform functions such as sending and receiving messages, configuring aspects of a BLE connection, and controlling bonding and pairing of wireless communication interface 108 to other devices (e.g., to POS terminal 15 using BLE).

Contactless interface 102 may provide for NFC communication with a contactless device such as NFC device 12 or chip card 14. Based on a signal provided by reader chip 100, an antenna of contactless interface 102 may output either a carrier signal or a modulated signal. A carrier signal may be a signal having a fixed frequency such as 13.56 MHZ. A modulated signal may be a modulated version of the carrier signal according to a modulation procedure such as ISO 14443 and ISO 13092. When the payment reader 5 is inductively coupled to a contactless device, the contactless device may also modulate the carrier signal, which may be sensed by the contactless interface 102 and provided to the reader chip 100 for processing. Based on these modulations of the carrier signal, payment reader 5 and a contactless device are able to communicate information such as payment information.

Contact interface 104 may be a suitable interface for providing power to a payment chip such as an EMV chip of a chip card 14 and communicating with the EMV chip. Contact interface 104 may include a plurality of contact pins (not depicted in FIG. 2) for physically interfacing with the chip card 14 according to EMV specifications. In some embodiments, contact interface 104 may include a power supply (VCC) pin, a ground (GND) pin, a reset (RST) pin for resetting an EMV card, a clock (CLK) pin for providing a clock signal, a programming voltage (VPP) pin for providing a programming voltage to an EMV card, an input output (I/O) pin for providing for EMV communications, and two auxiliary pins. In this manner, the payment reader and the chip card are able to exchange information such as payment information.

Power supply 106 may include one or more power supplies such as a physical connection to AC power or a battery. Power supply 106 may include power conversion circuitry for converting AC power and generating a plurality of DC voltages for use by components of payment reader 5. When power supply 106 includes a battery, the battery may be charged via a physical power connection, via inductive charging, or via any other suitable method. Although not depicted as physically connected to the other components of the payment reader 5 in FIG. 2, power supply 106 may supply a variety of voltages to the components of the payment reader 5 in accordance with the requirements of those components.

Wired interface 110 may include any suitable interface for wired communication with other devices or a communication network, such as USB, Lightning, FireWire, Ethernet, any other suitable wired communication interface, or any combination thereof. In some embodiments, wired interface 110 may allow payment reader to communicate with one or both of POS terminal 15 and payment server 40.

User interface 112 may include any suitable user interface (e.g., buttons, touchscreen, keyboard, voice recognition, biometric readers, etc.) that allow a user to directly interact with a payment reader 5. In some embodiments, many of the user interface interactions with a payment reader 5 may be accomplished by a point-of-sale application running on a POS terminal 15, and may be communicated via either wireless interface 108 or wired interface 110. User interface 112 may be a simple interface, such as a single button or limited set of buttons. Different types or sequences of button presses (e.g., holding a button down for more than a threshold time, particular sequences of button presses, etc.) may implement different functionality at the payment reader 5.

Memory 122 of reader chip 100 may include a plurality of sets of instructions for controlling operations of payment reader 5, such as operating instructions 130, transaction processing instructions 132, data authentication instructions 134 and signal conditioning instructions 136.

Operating instructions 124 may include instructions for controlling any suitable general operations of the payment reader 5, such as internal communications, power management, processing of messages, system monitoring, sleep modes, user interface response and control, operation of the wireless interface 108, operation of the transaction chip 140, and the management of the other sets of instructions. In one embodiment, the operating instructions 130 may provide the operating system and applications necessary to perform most of the processing operations that are performed by the processing unit 120 of the reader chip 100 of payment reader 5.

Operating instructions 130 may also include instructions for interacting with a POS terminal 15. In one embodiment, the POS terminal 15 may be running a point-of-sale application. The operating instructions 130 may include instructions for a complementary application to run on processing unit 120 of reader chip 100, in order to exchange information with the point-of-sale application. For example, the point-of-sale application may provide a user interface that facilitates a user such as a merchant to engage in purchase transactions with a customer. Menus may provide for the selection of items, calculation of taxes, addition of tips, and other related functionality. When it is time to receive payment, the point-of-sale application may send a message to the payment reader 5 (e.g., via wireless interface 108). The operating instructions 130 facilitate processing of the payment, for example, by acquiring payment information via the contactless interface 102 or contact interface 104, invoking the transaction chip 140 to process that payment information, and by generating responsive messages that are transmitted to the point-of-sale application of the POS terminal via wireless interface 108.

Operating instructions 130 may also include instructions for interacting with a payment server 40. In one embodiment, a payment server 40 may be associated with the payment reader 5 and the point-of-sale application of the POS terminal 15. For example, the payment server 40 may have information about payment readers 22 and POS terminals 15 that are registered with the payment server 40 (e.g., based on unique identifiers). This information may be used to process transactions with servers of the merchant and customer financial institutions, for providing analysis and reports to a merchant, and aggregating transaction data. The payment reader 5 may process payment information (e.g., based on operation of reader chip 100 and transaction chip 140) and communicate that processed payment information to the point-of-sale application, which in turn communicates with the payment server 40. In this manner, messages from the payment reader 5 may be forwarded to the payment server 40, such that the payment reader 5 and payment server 40 may collectively process the payment transaction.

Transaction processing instructions 132 may include instructions for processing payment transactions at payment reader 5. In one embodiment, the transaction processing instructions may be compliant with a payment standard such as those promulgated by EMV. Depending on the payment method that is being used (e.g., Europay, Mastercard, Visa, American Express, etc.), a particular processing procedure associated with the payment method may be selected and the transaction may be processed according to that procedure. When executed by processing unit 120, these instructions may determine whether to process a transaction locally, how payment information is accessed from a payment instrument, how that payment information is processed, which cryptographic functions to perform, the types of communications to exchange with a payment server, and any other suitable information related to the processing of payment transactions. In some embodiments, transaction processing instructions 132 may perform high level processing, and provide instructions for processing unit 120 to communicate with transaction chip to perform most transaction processing operations.

Wireless instructions 128 may include instructions for configuring a wireless interface, managing wireless pairing/bonding, optimizing throughput of the wireless connection, engaging in wireless communications, and controlling any other suitable functionality relating to the operation of a wireless interface of the payment reader (e.g., wireless interface 108). Although wireless instructions may operate in conjunction with any suitable wireless interface 108, in an exemplary embodiment the wireless interface 108 may be a BLE interface.

In some embodiments, wireless instructions 128 may include instructions for configuring wireless interface 108. In some embodiments, processing unit 120 of reader chip 100 may execute wireless instructions 128 to exchange messages in order to communicate with wireless interface 108 to configure the wireless interface 108 for operation. Any suitable parameters may be configured based on the wireless instructions, such as settings related to pairing/bonding (e.g., General Access Profile (GAP) settings, advertising modes, discovery modes, available roles, and white lists) and connections (e.g., General Attribute Protocol (GATT) settings, connection intervals, and maximum transmission units).

In some embodiments, wireless instructions 136 may include instructions for managing wireless pairing/bonding between wireless interface 108 and a wireless interface of the POS terminal 15. In some embodiments, wireless instructions may enforce a structured procedure for establishing, maintaining, and modifying connections between payment reader 5 and POS terminal 15. Although any suitable structured procedure may be implemented by wireless instructions 128, in some embodiments an exclusive connection may be established between payment reader 5 and a single POS terminal 15. Procedures may also be established for payment reader 5 to enter states where it may advertise for possible exclusive bonds with other POS terminals 29, for example, based on a user input.

In some embodiments, wireless instructions 136 may include optimizing throughput of a wireless connection between the wireless interface 108 of the payment reader 5 and a wireless interface of the POS terminal 15. In some embodiments, payment reader 5 may modify certain parameters of a particular BLE connection with a POS terminal 15 in order to optimize the connection (e.g., for a desired throughput, etc.). The payment reader 5 may set the parameters itself, and in some embodiments, may communicate with POS terminal 15 to receive a request to modify the parameters. For example, in some embodiments, the processing unit 120 of reader chip 100 of payment reader 5 may have low-level access to commands that are exchanged with wireless interface 108, such that payment reader 5 may modify numerous parameters that cannot be modified by a point-of-sale application running on a POS terminal 15, which may only be able to modify a limited subset of parameters or provide high-level commands (e.g., through a required API for the BLE interface of the POS terminal 15). In an embodiment, if a point-of-sale application operating on a POS terminal 15 desires to monitor or modify lower-level parameters of the BLE connection (e.g., maximum transmission units and connection intervals) it may communicate with the payment reader 5 to acquire the desired information or modify the lower level parameter.

In some embodiments, wireless instructions 136 may include instructions for engaging in wireless communications between a processing unit of payment reader 5 (e.g., processing unit 120) and processing of the POS terminal 15, via the wireless interface 108 of the payment reader 5 and a wireless interface of the POS terminal 15. During an active BLE connection, data packets may be exchanged via one or more BLE characteristics, with data packets able to be sent in modes such as an acknowledged and unacknowledged mode. In an unacknowledged mode, additional packets may be transmitted immediately after the unacknowledged message was sent (i.e., an unreliable message). In an acknowledged mode, additional packets may not be sent until the acknowledgement packet has been acknowledged by the other BLE device (a reliable connection), which occurs during a later connection event between the two devices. In some embodiments, processing unit 120 of reader chip 100 may execute wireless instructions 128 in order to selectively control the selection of acknowledgement packets and unacknowledged packets, for example, based on the type of information being transmitted.

In some embodiments, the payment reader 5 and the POS terminal 15 may combine acknowledgement packets and unacknowledged packets in a manner to provide a high-throughput reliable connection. For example, a plurality of data portions may be transmitted using a plurality of unacknowledged packets. A packet identifier may be included within each of the unacknowledged packets. During a single connection event, the device transmitting the data may send multiple unacknowledged packets (each including a data portion and a packet identifier) and the final packet of the connection event may be an acknowledgement packet. The device receiving the packets during the connection event (multiple unacknowledged packets and a final acknowledged packet) may respond to the acknowledgement packet during the next connection event with packet identifiers for all of the received unacknowledged packets. If the packet identifiers associated with all of the unacknowledged packets are received, the original sending device may send the next data portions during the next connection event. If not all of the packet identifiers are received, the missing unacknowledged packet may be resent (e.g., alone, or with additional packets) during the next connection event.

The data authentication instructions 134 include instructions to generate, provide or otherwise modify the reader profile associated with the reader 5. The reader profile varies as the reader moves from a first location to a second location. The reader profile can be modified either by a POS terminal 15 or by itself.

The reader 5 also includes sensor 126 such as a magnetometer, an accelerometer, transmitter/receiver of an antenna sub-system, camera, a GPS unit, a spectrum analyzer, a gyrometer, and the like. The sensor may be based upon any later-developed or convention sensor technology, such as CMOS, CCD, or the like. Image recognition components may be provided to process the image data. For example, such components can support functionalities including, but not limited to, location tracking, location detection, device fingerprinting, barcode detection, facial recognition, camera parameter control, etc. In one implementation, a new Trojan T2 triggers the reader 5 to review the state via the reader profile. In another example, measurement of signal strength from T1 and T2 with the reader itself indicates whether or not the reader profile has changed. For example, on detecting two transceivers, another test if performed to determine if the signal strength of T1 and T2 changes when the reader is re-located with respect to a new position or orientation, the lack of change triggers the reader profile to change above or below a certain threshold. The presence of the new transceiver T2 in close proximity to T1 and similar signal strength indicates that an unauthorized transceiver may be fraudulently tracking data exchange. This triggers creation a unauthorized device profile, which is different from the original reader profile. As such, the payment server 40 or the payment reader 5 sends notification to this effect indicating the merchant 3 that an unauthorized reader has either entered or removed from the territory thus exhibiting deviation from an established and stored reader behavior. The merchant 3 can then re-evaluate the state of readers R1 to determine if the reader has been tampered with and halt transactions until a resolution has reached.

Figure 3A:
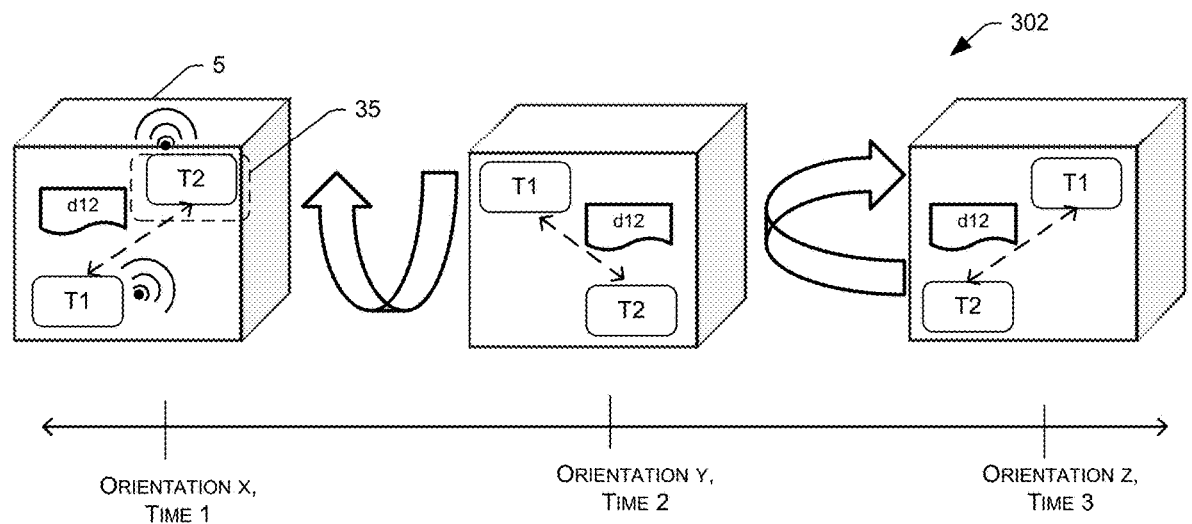
FIG. 3A depicts an illustrative scenario when an unauthorized device is detected by a device different from the device in which the unauthorized device is planted and when an unauthorized device is detected by a device in which the unauthorized device is planted in accordance with some embodiments of the present disclosure.

FIG. 3A is an illustrative scenario 302 in which a local device leverages signals, for example unidirectional or multi-directional signals emanating from one or more wired or wireless transmitter, receiver, or transceivers, where at least one wireless transceiver may be fraudulently placed in an environment of another wireless transceiver, to detect bogus devices. While the description here is described with reference to wireless transceivers, it will be understood that this can be any component that is capable of transferring information, obtaining information, or otherwise affecting the information in some way. Further, the component can be any device that can modify the data that it reads into something that is useful to it. For example, a device that can modify the card read data and convert it into a payment instrument that credits data to another payment instrument, for example one belonging to a fraudulent actor.

Attackers may install unauthorized devices (i.e., skimmers or shimmers) into payment terminals or other devices that process sensitive data in order to surreptitiously exfiltrate sensitive data. These attackers may install devices that use the device's existing power supply to power the unauthorized device. These attackers may also utilize wireless communication protocols (e.g. Bluetooth, Wi-Fi, Cellular, etc.) to transmit the data outside of the device so that the attacker does not need to physically access the device to retrieve the stolen data. A device that stores, process, or transmits sensitive data (e.g., a payment terminal) may utilize monitoring for both power consumption and/or wireless signals to detect an attack from an unauthorized attachment. The typical power consumption would be known to the manufacturer and could be monitored as an indicator of attack. Similarly, the manufacturer should know exactly what wireless signals should emanate from the device so any anomalous wireless transmissions could be an indication of attack. A manufacturer could employ signals of anomalous power consumption and/or rogue wireless signals to detect unauthorized attachments to their device.

In one implementation and as shown in FIG. 3A, a reader is configured or repurposed to detect a bogus skimmer/artifact, which does not pierce tamper shield, through local fixed signal detection. For example, the reader detects a nearby signal that does not change in strength as the reader moves. As shown in the figure, assume that unrecognized device 35 is placed in association or within the reader 5 having a legitimate wireless transmitter/receiver/transceiver. Further assume that the unrecognized device 35 includes an illicit transceiver T2 (generally in proximity to the legitimate transceiver T1).

To detect the presence of an illicit skimmer 35, in one implementation, the system detects the presence of a component, such as the wireless transceiver T2, by executing comparative analysis with respect to the wireless transceiver T1.

In some implementations, the determination of an illicit skimmer can be run in response to a trigger, such as lapse of a predefined time interval since the last check, drop in parameter (such as power or radiation levels from known components or devices in the reader, and other such environmental or behavioral changes). In other implementations, such checks can be performed randomly or whenever the merchant specifically requests such a check.

Once the system initiates the fraud detection, the reader 5 generates a set of instructions for the reader 5 to execute by leveraging, for example, sensors, such as accelerator, location tracker, etc. As shown, at orientation x, and time t1, the transceivers T1 and T2 may be d12 distance apart. Furthermore, the transceivers T1 and T2 may be emanating signals S1 and S2 respectively (not shown) while they are positioned where they are. The signal S2 emitted by T2 can be monitored by T1 or other such component within the reader. In one implementation, the reader, for example via display of the terminal, reader, etc., indicates the merchant to position the reader differently, i.e., in an orientation Y or Z, or even other positions, such as a higher plane or lower plane. As the orientation, direction or location of reader changes, i.e., to location/orientation Y or to location/orientation X, T1 re-measures the parameters (such as signal strength) emitting from T2 and/or the distance between the two. If the transceiver is co-located or does not change in reference to T1, the signals will also remain unchanged or substantially unchanged. Accordingly, it can ascertained that T2 has been fraudulently placed into the reader. The reader can implement remedial actions to this end. Such as disable the reader, abort transactions, order a new reader and so on.

In some implementations, the server generates the instructions to detect fraudulently placed devices, and further such instructions may be based on the server's ability to monitor and capture data from all the devices in the field. For example, if the server is able to see a specific kind of fraudulent attack at a specific location or with a specific kind of merchant, the server may initiate fraud detection on all readers matching the profile of the reader under attack. Such an insight may only be available to the server 40, which is in the unique position of communicating with readers, terminal, and other payment devices corresponding to all kinds of merchants. The server can implement analytical models, for example based on machine learning, to determine which of the readers in the field match the reader's profile irrespective of whether the readers are explicitly and directly connected. This helps avoid the possibility of over-correcting the readers that may not be under attack or that are not relevant to the reader under attack.

In some implementations, the reader 5 can detect, without explicit instructions from a server or otherwise, that it is in motion. For example, the reader 5 may detect via its motion sensor, such as an accelerometer, that it is in motion. The reader 5 can then track signals S1 and S2, for example through transceiver T1, and observe that the two signals do not change before, after, or during the detected motion, and even if they do, the change is substantially within a range of threshold. In other words, the behavior of T2 substantially corresponds to the behavior of T1. Accordingly, the reader 5 can ascertain that the source of signal S2, which in the example case is T2, is fraudulent.

In yet another implementation, the reader 5 can detect illegal skimmers or associated transceivers, without the merchant receiving instructions to position reader 5 differently and without leveraging an accelerometer or other motion sensor for motion detection. Instead the reader 5 and its transceiver T1 are configured to sense T2 and T3-Tn (not shown). While transceivers T3-Tn can be normal Bluetooth transceivers in the merchant environment, transceiver T2 is a fraudulent transceivers planted by fraudulent actor. As described herein, reader 5 can determine that the signal T1 detects from T2, i.e., signal S2, does not change substantially before, during, or after the signals T1 detects from T3-Tn are changing. In other words, the behavior of T2 closely corresponds to the behavior of T1. Accordingly, the reader 5 can ascertain that the source of signal S2, which in the example case is T2, is fraudulent, whereas other signals emanating from transceivers T3-Tn are not fraudulent and safe to communicate with reader 5.

Figure 3B:
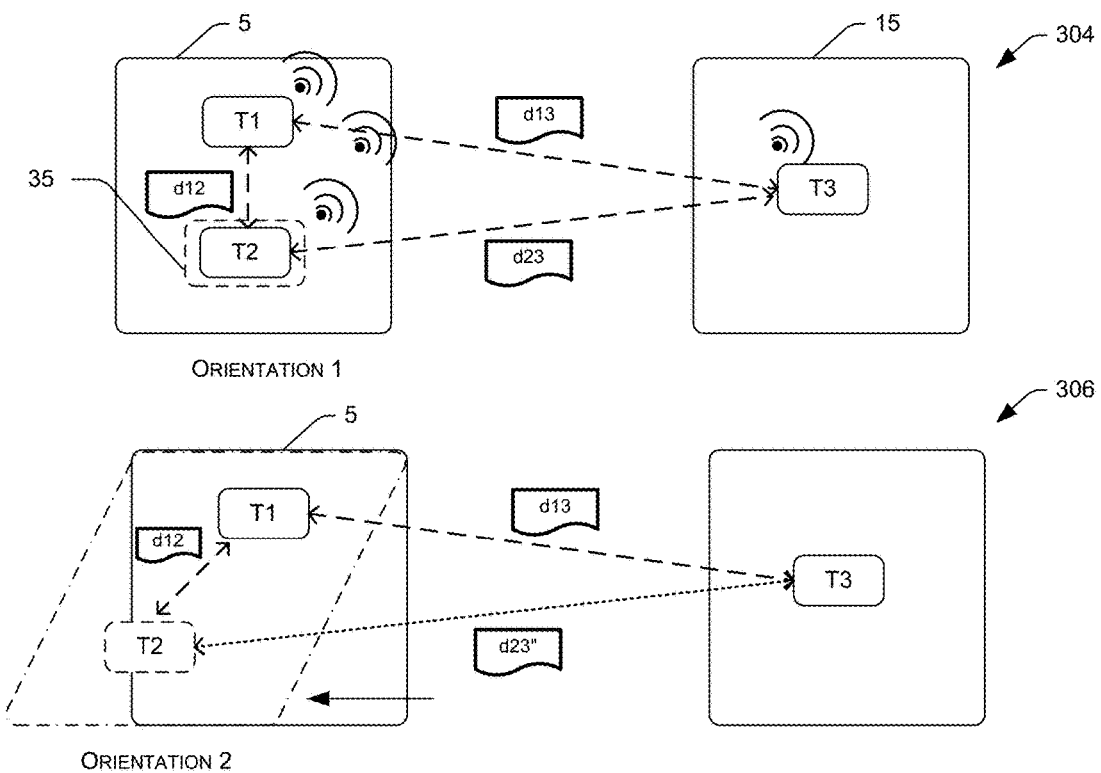
FIG. 3B depicts an illustrative scenario when an unauthorized device is detected by a device in which the unauthorized device is planted in accordance with some embodiments of the present disclosure.

FIG. 3B is an illustrative scenario indicating a reader detecting bogus skimmer/artifact, which does not pierce tamper shield, through remote tandem signal detection. For example, another device, such as a POS terminal or monitoring device, detects nearby signals that do not change in strength with respect to the POS terminal even when the reader moves or if the signals do change, they move in tandem.

To detect the presence of an illicit skimmer 35, in one implementation, the system detects the presence of a component, such as the wireless transceiver T2, by executing comparative analysis with respect to the wireless transceiver T1, by leveraging a third device, such as a POS terminal 15 or a monitoring device.

In some implementations, the determination of an illicit skimmer 35 can be run in response to a trigger, such as lapse of a predefined time interval since the last check, drop in parameter (such as power or radiation levels from known components or devices in the reader, and other such environmental or behavioral changes). In other implementations, such checks can be performed randomly or whenever the merchant specifically requests such a check.

Once the system initiates the fraud detection, the reader 5 generates a set of instructions for the reader 5 to execute by leveraging, for example, sensors, such as accelerator, location tracker, etc. The reader 5 can generate such instructions and forward them to a display associated with the POS terminal 15. Alternatively, the POS terminal 15 can generate such instructions either by itself or in combination with the reader 5. In some implementations, the POS terminal 15 can automatically initiate fraud detection, e.g., at predefined time intervals, without any defined instructions. As shown, at orientation 1, the transceivers T1 and T2 may be d12 distance apart. Furthermore, the transceivers T1 and T2 may be emanating signals S1 and S2 respectively (not shown) while they are positioned where they are. The signal S2 emitted by T2 can be monitored by a signal strength monitor, such as a wireless transceiver T3, or other such component within the terminal 15. Similarly, the signal S1 emitted by T1 can be monitored by T3 as well. In one implementation, the terminal 15 indicates the merchant to position the reader differently, i.e., in an orientation 2, or even other positions, such as a higher plane or lower plane. As the orientation, direction or location of reader changes, i.e., to location/orientation 2 (as shown in 306) or back to location/orientation 1 (as shown in 304), T3 re-measures the parameters (such as signal strength) emitting from T2 and T1. The transceiver T3 can also simultaneously measure distances between the transceivers, such as distance between T2 and T3, and T1 and T3, as d12, d23, and d13 respectively. The payment terminal 15 then observes and maps how the signals emitting from T1 and T2 change as the orientation changes. If the signals emitting from T1 and T2 remain unchanged or substantially unchanged with respect to each other, but change with respect to T3 as distance d23 changes to d23", it may be deduced that the transceivers T1 and T2 may be located in proximity to each other, and furthermore, it can be ascertained that T2 has been fraudulently placed into the reader. The reader can implement remedial actions to this end. Such as disable the reader, abort transactions, order a new reader and so on.

In some embodiments, the payment terminal 15 can execute fraud detection without an explicit instruction to move the reader in a certain orientation. Instead, the payment terminal 15 may monitor, for example at predetermined time intervals or in response to a trigger such as abnormal payment behavior such as high ticket purchase, the reader 5. While the reader 5 is being monitored, the payment terminal 15 collects data pertaining to movement of readers in its proximity, signal strengths from transceivers in its proximity, including T2, T3, . . . Tn (not shown) and distances between the detected transceivers in its environment. As described herein, reader 5 can determine that the signal T1 detects from T2, i.e., signal S2, does not change substantially before, during, or after the signals T1 detects from T3-Tn are changing. In other words, the behavior of T2 closely corresponds to the behavior of T1. Accordingly, the reader 5 can ascertain that the source of signal S2, which in the example case is T2, is fraudulent, whereas other signals emanating from transceivers T3-Tn are not fraudulent and safe to communicate with reader 5.

Figure 4:
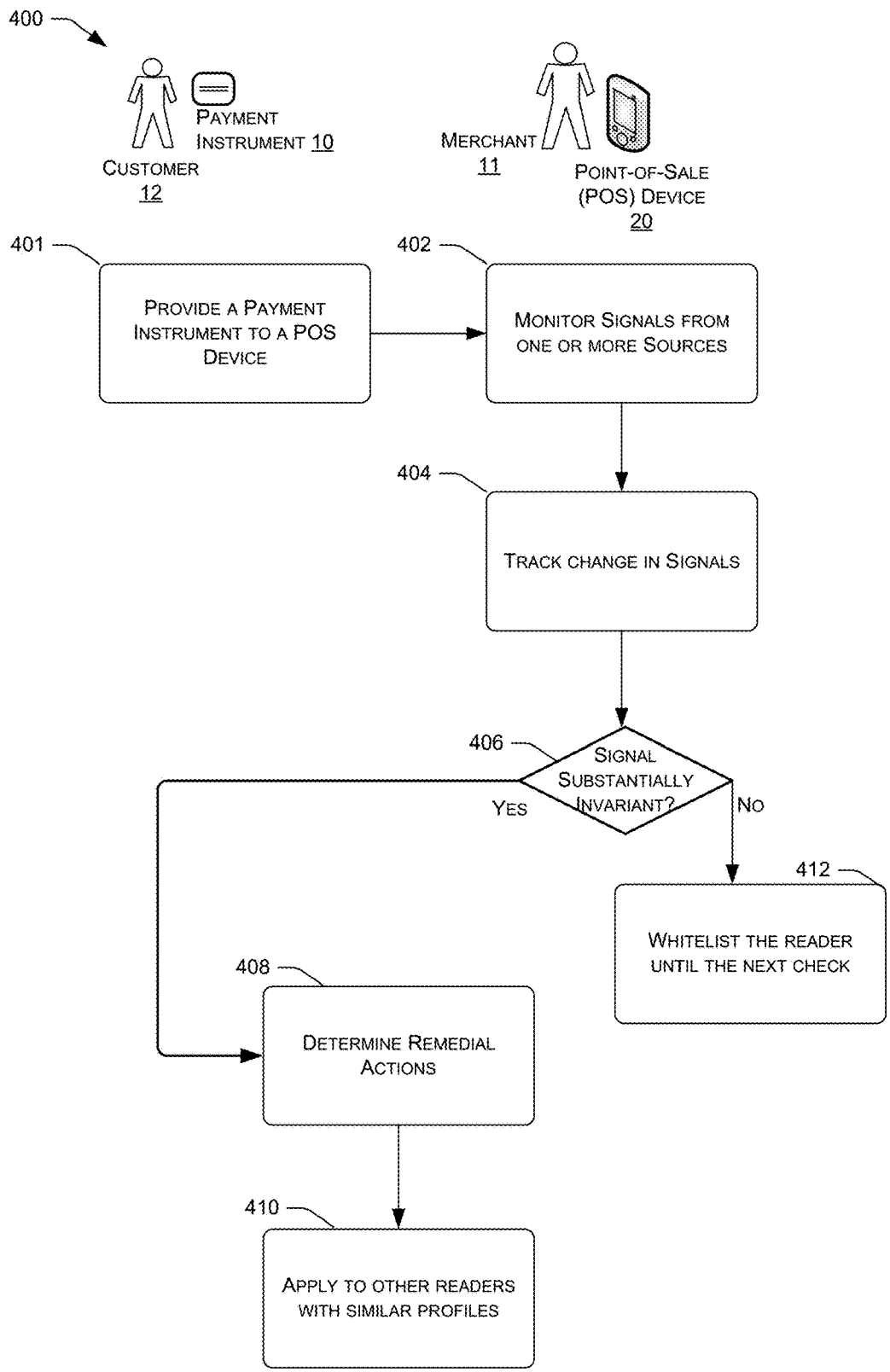
FIG. 4 depicts a non-limiting flow diagram illustrating a method for detecting an unauthorized device in an environment using the payment reader or the POS terminal.
Figure 5:
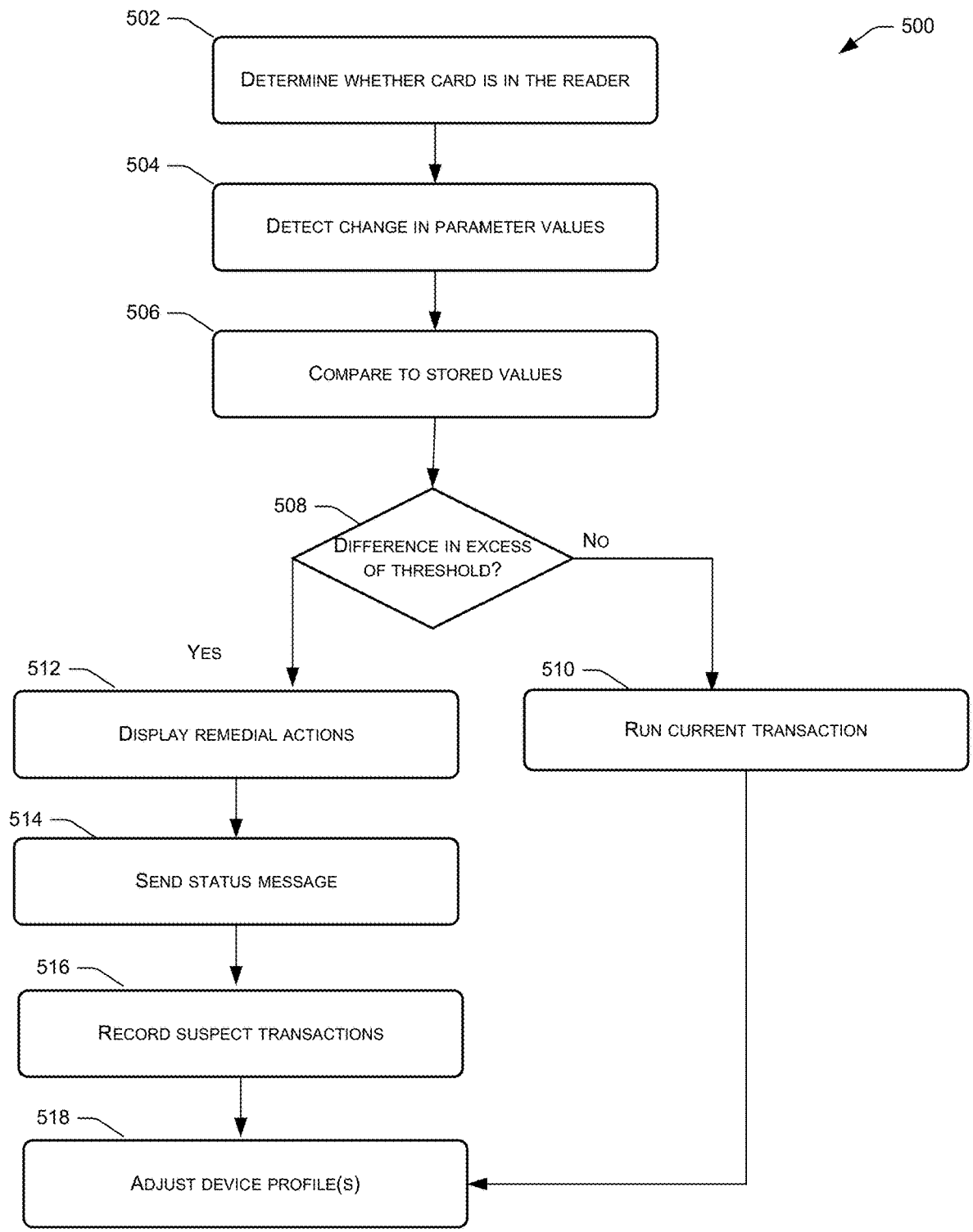
FIG. 5 depicts a non-limiting flow diagram illustrating a method for detecting an unauthorized device in a secure environment, in accordance with some embodiments of the present disclosure.

FIGS. 4 and 5 are sequence flows illustrating an example process 400 of a method of detecting software and hardware vulnerabilities in an otherwise authorized environment, according to an embodiment of the present subject matter. While the description here may use a payment environment as an example, it will be understood that the description and the embodiments described herein can be extended to any scenario where a hardware or software is vulnerable to hardware or software attacks.

The process 400, 500, and 600 can be performed by one or more components, devices, or components such as, but not limited to, the mobile device, the payment service system, merchant device or POS terminal, the payment reader, or payment beacon or other components or devices. Further, the process can be implemented by an ATM, a security device, a cryptographic unit, and so on. For the sake of explanation, the description hereinafter is described with reference to components described in FIGS. 1-3. It will be understood that the method can be carried out by any device or component of the payment system, e.g., the payment reader, the POS terminal, server or all in combination, for example contemporaneous to the payment reader.

The process 400 includes a process step at 401 at which the fraud detection may be initiated. For example, the fraud detection can be initiated at predefined time intervals or when a trigger, such as card read signal, behavioral signal, or a merchant generated trigger is obtained. The merchant generated trigger can include movement of the device with respect to another, or an explicit instruction by the merchant to check the device for security. Other conditions that may trigger the generation of a fraud detection request, for example, introduction of a unauthorized device, introduction of a previously known but disabled reader, introduction of a new payment application, introduction of a previously known but disabled payment application, addition of a new financial account, addition or association of a previously disabled financial account, and so on.

A device, such as a payment terminal, a payment reader, or even a dedicated monitoring device separate from the two, can be used to detect fraudulent attack, for example by detecting presence of an illegal hardware or software intrusion.

At step 402, in response to the fraud detection trigger, the device, such as a payment terminal or a payment reader, may detect and monitor, over time, parameters, such as signals, emanating from one or more sources (including, for example, potentially fraudulent device 35) in proximity to the device, or otherwise connected to the device, for example POS terminal 15, with a wired or wireless network. The device can measure specific parameters, such as signal strength, proximity, or power levels, of the signals. The parameters may be measured with respect to absolute values or relative values, i.e., with respect to a benchmark device. In some implementations, the device can measure the parameters based on specific instructions, such as instructions customized according to the reader, terminal, or payment environment. The instructions can define, for example, which sensor to implement, when to implement and a specific manner in which to obtain the values. The instructions can cause the device to be moved, oriented, tilted, or positioned in a certain way or pattern. Accordingly, the device can obtain signals from all sources corresponding to different positions.

In some implementations, the device can engage detectors, such as power detectors, accelerometer, etc., to obtain such values without specific instructions and notwithstanding detected motion, or in general, change in location, temperature, pressure, tile or rotation, line or angular velocity, intensity of light, and the like. In other implementations, the device is configured to perform fraud detection without the merchant receiving instructions to position the device differently and without leveraging an accelerometer or other motion sensor for motion detection. In such cases, the device determines whether the values change relative to another device but remain unchanged with respect to yet another.

The entry of a new device, such as an unknown transceiver corresponding to an unauthorized/fraudulent device or even an authorized reader different from the authorize device, into a known environment of the authorized device may also be detected through location detection techniques, such as techniques based on angulation, lateration, proximity detection, dead reckoning, geo-fence, global or local positioning systems, Bluetooth Technology, Near-Field Communication Technology, sensors-based technology, Radio frequency identification (RFID) system, or the like. In one embodiment, the present subject matter enables automatic geo-fence establishment and activation. According to the present subject matter, the geo-fence is defined and established based on a current location of an asset, for example using GPS data comprising latitude and longitude along with some predetermined area based on range or distance. In this manner, the user need not manually specify a location by drawing a perimeter, specifying a point location, or by any other means. So, specifically, the device monitors signals from all sources within its geofence and determines whether such signals change over time with respect to each other.

The device can also generate, or receive from the server, payload and detection sequences via the appropriate communication ports and protocols. The device then responds to such sequences accordingly. For example, the detection sequences can be queries to which the device (and components including transceivers) responds with a "yes" or a "no." In another example, the detection sequences dictates how the payload can be sent to a particular component of the device, such as the sensors, to further ascertain whether an unauthorized device is associated with the authorized device. The detection sequences also include instructions to send the information back to the requestor, for example to an application executing on the terminal and then to the server or directly to the server. In some cases, the responses may be encoded at the device level by appending randomly generated tokens to generate a unauthorized device profile.

The device can optionally apply an encryption technique, e.g., using tokenized pseudo-random numbers (also referred to as hash keys) to encrypt information obtained after an unauthorized device has been detected. The encryption technique may be specially reserved for such events and data collected from the unauthorized device or the authorized device for fraud detection. Such a technique may be different from the encryption technique used during normal device operations to not alarm the fraudulent actor who may deactivate the unauthorized device temporarily to avoid being found. A National Institute of Standard and Technology (NIST) compliant True Random Number Generator (TRNG) can generate the pseudo-random numbers. The encoding can also be done based on keys generated by a cryptographic unit (not shown). Examples of keys include authentication keys, which include SCP03 master keys (Message Authentication Code Key: MAC, Encryption Key: ENC and Key Encryption Key: KEK, which are 256-bit Advanced Encryption Standard (AES) symmetric keys with associated key derivation data) or Key Agreement Keys (e.g., user server signature verification public key, user server static public key, user static key pair with both public and private key). The encryption can also be created using other schemes, such as fuzzy vault algorithm, a cancelable fuzzy vault scheme based on irreversible hash functions, such as hash functions, such as MD, RIPEMD, and SHA.

At 404, the device determines whether the signals have changed, for example in value of strength or presence/absence, etc., based on another parameter, such as time, location, orientation, position, etc. For example, by monitoring the signals at different time intervals, the device can determine if the signal is changing with time. Additionally, if there are two sources, the device can also determine if the signals from the two sources are changing with respect to a change in location, orientation, or direction, and with respect to each other. To this end, the device can change the location, orientation, or direction, say in response to server or reader-generated instructions. Then, the device through sensors, such as accelerometer, location tracker, etc., can match whether the device is, in fact, changing the location, orientation, or direction in response to the instructions. If the signals are encoded, the device can apply a decryption technique corresponding to the encryption technique when performing the comparison.

At step 406, the device determines whether the signals remain substantially invariant with respect to each other, or another reference point signal. For example, if the signal value changes outside of certain range of values, the signal is deemed variant. In one implementation, the device determines whether the unauthorized device emits a signal of substantially the same strength as that emitted from the device; whether the unauthorized device behaves in a manner substantially similar to the device; whether the unauthorized device reacts, to a sub-routine, in a manner substantially similar to the device; whether movement of the unauthorized device is substantially similar to that of the device; or whether orientation of the unauthorized device is substantially similar to that of the first device.

In one embodiment, the server 40 or terminal may compare the measure of change or variance of the signals with a threshold value to determine whether or not the signals are substantially invariant. In other words, by measuring deviation of signals from each other or with respect to a certain threshold, the device measures whether other devices (the authorized and the unauthorized devices) substantially correspond to the device, for example in terms of behavior, performance or response time. If the operation at step 406 yields a "No," the flow transitions to step 412, where the unauthorized device is authenticated as being previously registered or otherwise not fraudulent. Thus, as shown in the figure, the unauthorized device is whitelisted until the next time a check is performed. Whitelisting may mean providing complete or limited access to the device to enable one way or multiple-way communication between the two devices.

In some implementations, the merchant may authorize use of the unauthorized device so that it is whitelisted indefinitely. For this, in one example, the merchant is asked to key in a card verification value or some other kind of authentication code into a field in the terminal's display message. The code is also saved in the device-object relationship and is retrieved every subsequent time the device alone is used as a means for authenticating a payment transaction.

However, if the operation (step 406) yields a "Yes," the flow transitions to step 408 where the device determines remedial actions to prevent the fraudulent actor from controlling or otherwise accessing the authorized device. At step 408, the device can create a remedial action in the form of an alert to indicate to the operator of the device, such as a merchant, that there may be potential security vulnerabilities. For example, the alert may be a notification indicating a potential attempt to fraudulently add a unauthorized device or payment application to the merchant's account. The alert may be sent to the device or devices associated with the merchant. This step of detecting fraudulent actor in vicinity of the device may be performed contemporaneous to the step of remedial actions in response to such detection. In some implementations, the remedial actions include, but are not limited to: disconnecting the device from its environment, i.e., server and payment terminal; maintaining communication with the unauthorized device to obtain more intel on the unauthorized device; and canceling all pending and current payment transactions.

At step 410, the device can send the information to the server, which can communicate with multiple POS systems corresponding to multiple locations or multiple merchants. The server can determine a profile of the device which has been tampered with, and create a profile to take into account its past state and its current state after the fraudulent attack. The server can track behavior of other readers in the field that match this profile and develop a specific model for the readers based on the behavioral analysis to detect any other unrecognized components that may have been planted in the same or similar way. For example, by analyzing physical and performance attributes of the detected, unrecognized component within or associated with the reader, or any of its components, the server can help detect other such components in the wild by creating a profile of illegitimate components and executing similar verifications on all readers or readers that match the profile of the reader that was found to be infected. For example, the readers that match the profile of the specific reader can be another reader that is registered to the same merchant, similar merchants, merchants in the same geographical location, and so on. Once other readers are identified to also have been potentially attacked, additional verification, may be performed to determine with certainty whether the matching readers are potentially tampered, for example, based on deviation in known behavior of a merchant environment of readers and terminals and their interaction with each other. Any anomaly therein is indicative of a potentially fraud event. Accordingly, remedial actions may be undertaken for such readers as well. In this way, once a fingerprint of a fraudulent actor is analyzed and created, it can be used to track, in a blanket way, several readers in the wild that may have illegitimate transceivers planted by the fraudulent actor or using a technology matching theirs.

While the description hereinafter discusses readers and their movement as a tool for detection of a fraudulent behavior, it will be understood that any other device or instrument that uniquely identifies a behavioral change can be used. Further, the fraud detection as described herein can be used for or to support card authentication, targeted monitoring of readers and their environments, delivering customized instructions to establishing pre-orders, facilitating delivery of orders, and the like. The reader or their behaviors, when registered, enables the merchant to pay receive payment without having to worry about a fraudster swapping the portable readers. Owing to the unique and personalized nature of reader behaviors with respect to the payment terminal, payment transactions are less vulnerable to frauds. The use of readers in conjunction with POS terminal and/or mobile payment applications makes it virtually impossible to feign or replicate the combination. Further, the fraud detection technique leveraging the registered reader profile is friction-less, quicker, easier, more efficient, and more convenient especially when compared to traditional methods of payment that require manual checks. Further, according to the present subject matter, it is possible the methods and systems to determine fraud by confirming behavior of not just one, but a cluster of readers and other devices in proximity to the POS terminal. So, the payment transaction is authenticated when both a wearable watch and mobile phone, previously registered to represent the buyer, are present. If the wearable watch or the mobile phone is missing, the transaction maybe denied. This clustering leads to a more robust design of authentication.

FIG. 5 depicts a non-limiting flow diagram illustrating a method for detecting an unauthorized device in a secure environment, in accordance with some embodiments of the present disclosure. The exemplary simplified logic flow executed by a controller for detecting the installation of an unauthorized device. It should be understood that this transaction logic is part of the overall operation of the reader, terminal or server, or even a monitoring device, to carry out transactions. The exemplary logic flow is carried out through the execution of software instructions by at least one processor. The software instructions may be resident on any form of article which includes computer readable instructions such as a hard disk, floppy disk, semiconductor memory, flash memory, CD, DVD, ROM or other article. In this exemplary logic flow, the machine operates to carry out card reading transactions in a normal manner and to additionally execute the represented steps as a part of such logic each time a card is read. In some implementations, the represented steps are executed at predefined time intervals or whenever a trigger is obtained, such as a manual trigger from a merchant or server.

From an initial step 502, the controller in the device is operative to sense that a card is in the reader within the device. It will be understood that such checks can also be performed when a transaction is not taking place. Generally in these circumstances the controller will be operating the sensors as the user has inserted their card and the card has been drawn into the machine. In this exemplary embodiment the controller continues to operate the sensors and senses the parameter level or levels (such as power levels, signal strength, etc.) sensed by one or more sensors. This is done in a step 504.

The controller is next operative to compare the signals corresponding to the sensed radiation levels to one or more values in a step 506. This comparison may be done a number of ways and may in some embodiments execute fuzzy logic so as to avoid giving false indications due to acceptable conditions such as a user having the user's finger adjacent to the card slot during a portion of the transaction. In the case of a user's finger for example, the computer may determine whether an unauthorized reading device is installed based on the nature, magnitude and changes during a transaction in sensed parameter values, along with appropriate programmed weighing factors. Of course various approaches may be used within the scope of the concept discussed herein. However, based on the one or more comparisons in step 506, the controller is operative to make a decision at step 508 as to whether the sensed value(s) compared to stored value(s) compared in step 506 have a difference that is in excess of one or more thresholds which suggest that an unauthorized card reading device has been installed.

If the comparison does not indicate a result that exceeds the threshold(s) the transaction devices are run as normal as represented in a step 510. For example, a customer may be prompted to input a PIN, and if the card data and PIN are valid, the customer may be authorized to conduct a cash dispensing transaction through operation of the machine. Further, in the exemplary embodiment the controller may operate to adjust the stored values to some degree based on the more recent readings. This may be appropriate in order to compensate for the effects of dirt on the fascia or loss of intensity of the emitting devices or other factors. This is represented in a step 518. In step 518, the controller operates the machine to conduct transaction steps in the usual manner as represented in a step 518.

If in step 508, the difference between the sensed and stored values exceeds the threshold(s), then this is indicative that an unauthorized card reading device may have been installed since the last transaction. In the exemplary embodiment when this occurs, the controller is operative to present a warning screen to the user as represented in a step 512. This warning screen may be operative to advise the user that an unauthorized object has been sensed adjacent to the card reader slot, or provide remedial actions such as abort the transactions, allow server to take over, and so on. This may warn a user for example that a problem is occurring. Alternatively if a user has inadvertently placed innocently some object adjacent to the card reader slot, then the user may withdraw it. In addition or in the alternative, further logic steps may be executed such as the machine prompting a user to indicate whether or not they can see the sensors being illuminated adjacent to the card slot and prompting the user to provide an input to indicate if such items are visible. Additionally or in the alternative, the display or speaker may be operative to output words or other symbols which a user can indicate that they can see or cannot see based on inputs provided as prompts from output devices of the machine. In some alternative embodiments, sensors or cameras may be utilized to observe the outputs through the fascia, and are connected to processors including suitable programming to determine if particular outputs are not sensed or perceivable. The absence of the ability to perceive such signals may be indicative of the installation of an unauthorized interception device. This may enable the machine to determine whether an unauthorized reading device has been installed or whether the sensed condition is due to other factors. It may also cause a user to note the existence of the reading device and remove it. Of course various approaches could be taken depending on the programming of the machine.

If an unauthorized reading device has been detected, the controller in the exemplary embodiment will also execute a step 514 in which a status message is sent to an appropriate service provider, such as server 40, or other entity to indicate the suspected problem. In a step 516, the controller will also operate to record data identifying for the particular transaction in which there has been suspected interception of the card holder's card data. In addition or in the alternative, a message may be sent to the bank or other institution alerting them to watch for activity in the user's card account for purposes of detecting whether unauthorized use is occurring. Alternatively or in addition, some embodiments may include card readers that change, add, or write data to a user's card in cases of suspected interception. Such changed data may be tracked or otherwise used to assure that only a card with the modified data is useable thereafter. Alternatively or in addition, in some embodiments the modified card may be moved in translated relation, moved irregularly, or otherwise handled to reduce the risk that modified data is intercepted as the card is output from the machine. In other exemplary embodiments, card readers may be provided which include features for reading a card inserted in a direction that is generally transverse to the direction of the extending magnetic stripe of the card. That is, instead of inserting a short edge of a card into a card input slot, a long edge of the card can be inserted first into the card slot.

In the exemplary embodiment the machine is operated to conduct a transaction even in cases where it is suspected that an unauthorized card reading device has been installed. However, in other embodiments other approaches may be taken such as refusing to conduct the transaction. Other steps may also be taken such as capturing the user's card and advising the user that a new one will be issued. This approach may be used to minimize the risk that unauthorized transactions will be conducted with the card data as the card can be promptly invalidated. Of course other approaches may be taken depending on the programming of the machine and the desires of the system operator. In addition while the fraud device shown is an unauthorized card reading device, the principles described may also be used to detect other types of fraud devices such as for example false fascias, user interface covers and other devices. In some embodiments additional or alternative features and methods may be employed to help detect the presence of unauthorized card reading devices or other attempted fraud devices in connection with the machine. For example in some embodiments an oscillation sensor may be attached to the machine to detect changes in frequency or vibration that result from the installation of unauthorized devices on the machine. The oscillator may be operative responsive to the controller and suitable vibration circuitry to impart vibratory motion to the fascia in the vicinity of the card reader slot. A sensor is in operative connection with the fascia and is operative to sense at least one parameter of the motion imparted to the fascia by the oscillator. Although oscillator and sensor are described as separate components, it should be understood that in some embodiments the functions of the components may be performed by a single device. The installation of an unauthorized card reading device or other fraud device on the machine will generally result in a change in at least one property being sensed by the sensor. This may include changes in amplitude, frequency or both. Alternatively or in addition, some embodiments may provide for the oscillator to impart vibration characteristics of various types or vibratory motion through a range of frequencies and/or amplitudes. Sensed values for various oscillatory driving outputs may then be compared through operation of the controller to one or more previously stored values. Variances from prior values may be detected or analyzed through operation of the controller and notifications given in situations where a change has occurred which suggests the installation of an unauthorized device.

In some embodiments the controller may cause the oscillator and sensor to operate periodically to sense for installation of a possible unauthorized device. Alternatively, the controller may cause such a check to be made during each transaction. Alternatively in some embodiments oscillation testing may be conducted when a possible unauthorized device is detected by sensing radiation properties. The controller may operate to take various actions in response to sensing a possible unauthorized reading device through vibration, radiation or both. For example detecting a possible fraud device by both radiation and oscillation may warrant taking different actions than only detecting a possible fraud device through only one test or condition. In some embodiments the controller may be programmed to adjust the thresholds or other limits used for resolving the presence of a possible fraud device for responses to changes that occur over time at the machine. This may include for example adjusting the thresholds for indicating possible fraud conditions based on the aging of the oscillator or the sensor. Such adjustments may also be based on parameters sensed by other sensors which effect vibration properties. These may include for example, the fascia temperature, air temperature, relative humidity and other properties. Of course readings from these and other sensors may be used to adjust thresholds of the oscillation sensor, radiation sensor or other fraud device sensors. Various approaches may be taken depending on the particular system. In some embodiments the oscillator may additionally or alternatively be used to prevent the unauthorized reading of card reader signals. This may be done for example when the banking machine has a device which takes a user card into the machine for purposes of reading data on the card. In such embodiments the controller may operate to vibrate the area of the fascia adjacent to the card reader slot when a user's card is moving into and/or out of the slot. In such cases the vibration may be operative to cause the generation of noise or inaccurate reading by an unauthorized card reading sensor so as to make it more difficult to intercept the card stripe data using an unauthorized reading device. In some embodiments such vibration may also serve to disclose or make more apparent the presence of unauthorized card reading devices.

These approaches are exemplary and in other embodiments other approaches may be used. In some exemplary embodiments provision may be made for detecting the presence of unauthorized devices for sensing a user's inputs through the keypad on the machine. Such unauthorized devices may be used by fraudulent actors to sense the PIN input by the user. Detecting unauthorized devices may be accomplished by providing appropriate sensing devices in or adjacent to the keypad. Such sensing devices may be operative to detect that a structure has been placed over or adjacent to the keypad. Such sensors may be used to determine the probable installation of such an unauthorized device. In response to determining the probable installation of such a device, the controller may provide notification to appropriate entities, modify the operation of the machine such as to disable operation or prevent certain operations, or to take other appropriate actions, such as update reader profiles as described with reference to FIG. 1B, and as shown in step 518.

Figure 6:
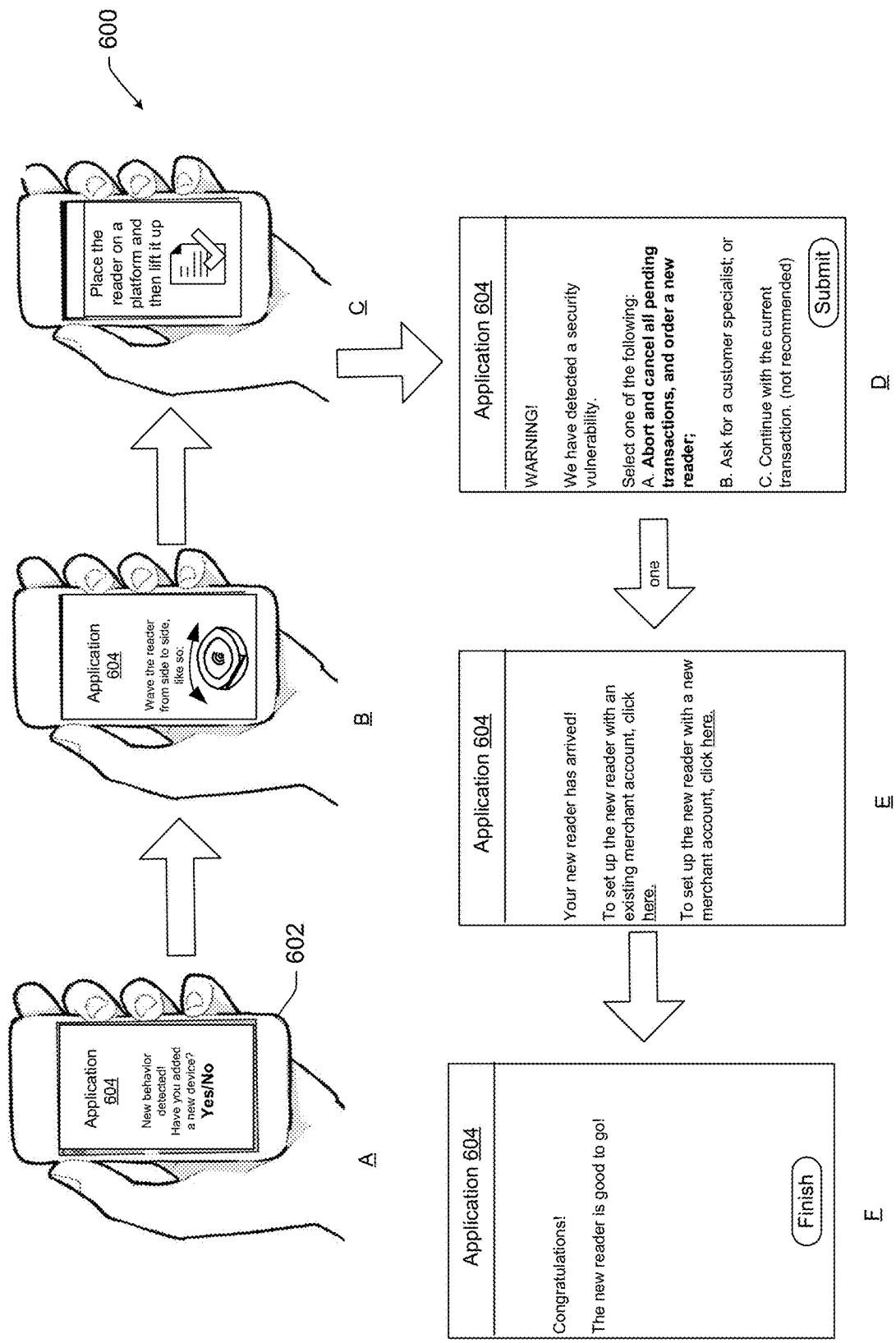
FIG. 6 depicts user interfaces illustrating various notifications sent on a mobile device of the merchant indicating to the merchant that a change has occurred with respect to the payment readers, and that such a change may be associated with an unauthorized reader in a secure environment, in accordance with some embodiments of the present disclosure.

FIG. 6 is a sequence flow diagram 600 that illustrates an example security flow showing graphical interfaces on a merchant device, such as POS terminal 15, according to an embodiment of the present subject matter. The device can be used in various interactions, for example in authentication or authorization of a reader or payment application, to send instructions to indicate fraud, to take remedial actions in response to fraud detection, to register a device that has been deemed unauthorized, target a merchant with offers for improved security applications, for customized instructions to remediate effects of the fraudulent attack, for pre-orders of authorized readers to replace the reader that has been fraudulently modified, for delivery of pre-orders of the readers, and the like.

The sequence flow method 600 is applicable both in embodiments in which the registered device characteristic stays resident solely on the payment object reader and also in embodiments in which the registered device characteristic is transmitted from the mobile device or the payment object reader to payment server, according to embodiments of the present subject matter. For ease in understanding, assume that the merchant implements reader fingerprinting to detect anomalies in environment, such as those introduced, unbeknownst to the fraudulent user, by a fraudulent user. Even though events A-F, in one example scenario, are in sequence; other sequences are also possible.

The user interfaces A-F may allow for the display, execution, interaction, manipulation, and/or operation of program components and/or system facilities through textual and/or graphical facilities through one or more interaction interface elements, such as check boxes, cursors, menus, scrollers, and windows (collectively and commonly referred to as widgets) to facilitate the access, capabilities, operation, and display of data and computer hardware and operating system resources, and status. The user interfaces may be used to provide a baseline and means of accessing and displaying information graphically to users. The user interface may also be a graphic user interface as provided by, with, and/or atop operating systems and/or operating environments such as discussed herein.

In various embodiments, the user interface is relayed on an audio or video display with a touch screen and driver, the touch screen being based upon a variety of later-developed or current touch screen technology including resistive displays, capacitive displays, optical sensor displays, electromagnetic resonance, or the like. Additionally, touch screen display may include single touch or multiple-touch sensing capability. Any display technology may be used for the output display, such as a Liquid Crystal Display (LCD) or solid state device such as light-emitting diode (LED) or organic light-emitting diode (OLED), a thin film transistor (TFT) display, Plasma display, trans-reflective (Pixel Qi) display, electronic ink display (e.g. electrophoretic, electrowetting, interferometric modulating).

In various embodiments, the resolution of such displays and the resolution of such touch sensors may be set based upon engineering or non-engineering factors (e.g. sales, marketing). In some embodiments, speakers and LED indicators can be used to present audio and visual identifiers of transaction and device status.

To detect and validate whether a merchant's reader is secure, the reader or a terminal can initiate a process when a card is detected, i.e., during or after a payment transaction, or at predefined intervals, or when a security flaw is detected at another merchant location, or in the neighborhood of the merchant. In one implementation, the reader may detect a new reader profile, e.g., change in values of a certain parameter, such as signal strength, radiation levels, temperature or pressure change, weight change, location change, etc. In other implementations, this check may be performed when a card is entered into the reader and an anomaly in behavior is detected. The user interface A of the POS terminal 602 reflects an example message "New behavior detected. Are you trying to attempt to connect an unauthorized device?" The messages shown may be generated in a messaging application 604 or as part of a text or email notification. In some examples, the check may be triggered by a server or a merchant and step A may be completely skipped.

The user interface B of the POA terminal 602 presents the user with another message to start the fraud detection flow. At this time, the payment object reader through the mobile device 602 can also display a message to indicate additional device configuration changes that need to be made to allow the payment object reader to access the components embedded in the device in order to detect an unauthorized device. For example, the payment object reader determines that connection via Bluetooth and NFC is available. The reader then indicates that the reader be moved or oriented in a specific direction. This too can be part of the user interface B. For example, the message can be of the form "wave the reader from side to side." Such instructions may be specific to the merchant's reader, i.e., based on how the reader is currently situated. Furthermore, the reader tracks the response of the merchant based on the instructions and sends corrected instructions if the merchant response does not match to what is being requested. For example, the interface may generate a message indicating "slow down!" or "match the movement to what's shown" and so on. In another scenario, the instructions may be changed if the merchant incorrectly responds more than a certain number of times, or if data cannot be properly collected. For example, an easier instruction may be presented to the merchant, such as "move the reader so as to form any shape in the air." These tests may be used to determine whether there is a parasitic device and as such, a security flaw with the reader, or other payment devices. This has been explained in previous sections.

The user interface C of the payment terminal 602 indicates that an unrecognized device may be connected to the reader and requests the user to enter the password or CVV or the like associated with the payment object to allow registration of the new and recognized component with the payment terminal (if the merchant so chooses) or if the merchant is unsure what the new component is, perform remediation steps. If the merchant chooses to register the device, the payment terminal obtains device characteristics, e.g., physical, mechanical, location, magnetic, electro-mechanical, or operational characteristics, or a combination thereof and stores the relationships of the payment reader with the characteristics, encoded or not, in a database, either within the payment object reader or associated with the payment terminal or payment processing system. Alternatively, if the merchant is still unsure of the device, the server, the reader, or the terminal, depending on which entity is performing the steps as any one of them or combination of these devices, can execute the steps to fix the security flaw.

The user interface D of the payment terminal 602 presents the user with options to set conditions or limits to the use of device as a payment instrument. For example, another user such as the account holder can specifies one or more conditions (restrictions) to be applied to the beneficiaries or the buyer's use of the device after the detection of a security flaw. The conditions can include, for example, conditions upon the time and/or manner of use of the device. Conditions on the time of use of the device can include, for example, limiting to or exclusion of specific dates or date ranges, specific days of the week, specific time ranges within a day (e.g., "11:00 AM to 2:00 PM" or "lunchtime"), etc., or any combination thereof. Conditions on the manner of use of the device can include, for example, limiting to or exclusion of specific merchants or types/categories of merchants (e.g., restaurants); limiting to or exclusion of particular goods or services; setting a maximum amount per transaction, or per merchant, or per merchant per transaction (which could apply to a specific merchant or to all merchants); limiting to or exclusion of a particular location or locations where the funds can be used, etc., or any combination thereof. Further, the buyer can be allowed to specify exceptions to some or all of the conditions. Hence, the conditions can be in the form of a whitelist (allowable items), or a blacklist (non-allowable items), or a combination thereof. At least some of the conditions may be hyperlinked to take the funder to additional pages/screens, to allow the funder define more-specific conditions. Thus, an owner can set conditions on what employees can purchase with a reader.

In one implementation, the conditions can be (a) abort and cancel all pending transactions, and request a new reader as the current reader is tampered with; (b) ask for a customer specialist which can be automated instructions to guide the merchant to trouble shoot and determine if additional tests need to be performed for fraud detection; and (c) continue with the current transaction by taking on the liability of operating the device under insecure conditions. The reader profile may be accordingly adjusted. In some cases, the analysis of the tampered or potentially tampered with reader can provide insights into how other readers in the field may be similarly tampered. Such analysis can be performed after or contemporaneous to this step. Accordingly, other readers can be sent messages similar to message in user interface A or B.

The user interface E of the mobile device 602 present the user a message indicating the new reader has reached its destination (i.e., merchant location) and that the user can set it up either with an existing account, i.e., the account that was connected to the old, tampered reader, or with a new account.

The user interface F of the mobile device 602 presents the user a message confirming successful fixing of the reader based on a detected anomaly in reader profile, for example in response to the merchant selecting option A or B. Such notification can also be sent as verification on merchant's email address, phone number and other communication identifiers connected to merchant account. It will be understood the user interfaces A-E are only for the purpose for illustration. The content, format and layout may vary from one device and one operating system to another. Further the content can vary based on various factors such as the method of device fingerprinting, and rules set by the merchant or customer or both.

A method for detecting an unauthorized device associated with a payment card reader connected to a payment terminal, the method comprising: receiving, by a power detector of the payment card reader, a range of acceptable power consumption values for the payment card reader, wherein the payment card reader observes the range using one or more sensors or transceivers for operations including processing payment transactions and communicating data to the payment terminal or a remote server; detecting, by a security unit of the payment card reader, a change in power consumption values and for the payment card reader to operate outside of the range of acceptable power consumption values for the same or similar operations, wherein the change is attributed to presence of the unauthorized device in association with the payment card reader; and generating, by the security unit of the payment card reader, an interrupt to cause the operations to be ceased subsequent to detection of the presence of the unauthorized device.

While the embodiments described herein may relate to brick-and-mortar retails stores using POS terminals, including self-checkout terminals, it will be understood that the embodiments can be extended to shopping at any e-commerce location, including online shopping via merchant websites or applications.

Various embodiments and implementations of the disclosed fraud detection technology are now described. The following description provides specific details for a thorough understanding and an enabling description of these implementations. One skilled in the art will understand, however, that the disclosed system and methods may be practiced without many of these details. Additionally, some well-known structures or functions may not be shown or described in detail, so as to avoid unnecessarily obscuring the relevant description of the various implementations. The terminology used in the description presented below is intended to be interpreted in its broadest reasonable manner, even though it is being used in conjunction with a detailed description of certain specific implementations of the disclosed system and methods. Some frequently used terms are now described.

As used herein, a merchant may include any business engaged in the offering of goods or services for acquisition by buyers. Actions attributed to a merchant may include actions performed by owners, employees, or other agents of the merchant and thus no distinction is made herein unless specifically discussed. In addition, as used herein, a buyer may include any entity that acquires goods or services from a merchant, such as by purchasing, renting, leasing, borrowing, licensing, or the like. As used herein, goods and/or services offered by merchants may be referred to as items. Thus, a merchant and a buyer may interact with each other to conduct a transaction in which the buyer acquires an item from a merchant, and in return, the buyer provides payment to the merchant, for example through a biometric payment instrument.

As used herein, a 'payment transaction' or simply 'transaction' may include a financial transaction for the acquisition of goods and/or services that is conducted between a buyer and a merchant. For example, when paying for a transaction, the buyer can provide the amount that is due to the merchant using a payment proxy. In other cases, the payment transaction includes transfer of money from one party to another for any number of reasons. Thus, while the description refers to as buyer and merchant as parties to the payment transaction, it will be understood that the parties can be a sender and a recipient, a land lord and a renter, a bank and a bank customer, a first friend and a second friend, and so on.

The term 'payment card' or 'payment instrument' refers to a payment mechanism that includes a conventional debit card, a conventional credit card, a prepaid gift card, or the like, a smartcard that has an embedded integrate circuit chip (e.g., Europay-MasterCard-visa (EMV) card), a proxy card, or any card that functions as a combination of any of these mechanisms. The term 'proxy card' as used herein refers to a card that may or may not bear a card number or an account number that appears to be that of a real credit or debit card account (i.e., it is in the correct format), but where that card/account number is actually only a proxy for the buyer's real card/account number. Additionally, the payment card used in the example above is a specific type of a financial instrument. Other types of financial instruments, other than the payment card, can be used to initiate the transfer of funds. A financial instrument can be a software instrument or virtual instrument, such as a virtual wallet. Other examples of payment card may also include a prepaid card, a gift card, a rewards card, a loyalty points' card, a frequent flyer miles card, a check, cash, or any other kind of payment instrument that holds financial value or provides a promise to pay at a later time. Payment card may also include a payment object, such as an electronic device configured to initiate contactless payment transactions, e.g., a key fob, a mobile device (such as a mobile device having an NFC tag). And finally, the payment object can also be a payment proxy having a syntax of a monetary indicator followed by a string of alphanumeric characters or in general, any identifier that is representative of the buyer or merchant's financial account. The payment proxy can be used in the context of and within a webpage as part of the web address, a social networking handle or username, a forum, a messaging application, and so on.

The term 'biometric payment instrument' is a type of payment instrument or financial instrument that is biometrically identifiable and initialized by a biometric characteristic, such as a person's finger (e.g., for fingerprint recognition), face, iris or retina, heartbeat, voice, etc.

The term "landing page," as used here, refers to a virtual location identified by a location address that is dedicated to collect payments on behalf of a recipient associated with the location address. In some embodiments, the landing page is identified by a graphical user interface (GUI) of a mobile payment application installed on a client device of the sender. The landing page is generated by the payment service system to receive, e.g., collect, one or more payments on behalf of the recipient from one or more senders. The sender can access the landing page, e.g., by entering a URL into a web browsing application installed on the sender's client device. Upon navigating to the URL, the sender can simply enter a payment amount, e.g., in a web form field, and send the money, e.g., by selecting a "Pay" action button displayed on the website. In another example, the sender can access the landing page, e.g., by selecting a GUI within a mobile payment service application. The sender can further enter a payment amount at the GUI and send the money, e.g., by selecting a "Pay" action button displayed on the GUI.

The foregoing is merely illustrative of the principles of this disclosure and various modifications may be made by those skilled in the art without departing from the scope of this disclosure. The above described embodiments are presented for purposes of illustration and not of limitation. The present disclosure also can take many forms other than those explicitly described herein. Accordingly, it is emphasized that this disclosure is not limited to the explicitly disclosed methods, systems, and apparatuses, but is intended to include variations to and modifications thereof, which are within the spirit of the following claims.

As a further example, variations of apparatus or process parameters (e.g., dimensions, configurations, components, process step order, etc.) may be made to further optimize the provided structures, devices and methods, as shown and described herein. In any event, the structures and devices, as well as the associated methods, described herein have many applications. Therefore, the disclosed subject matter should not be limited to any single embodiment described herein, but rather should be construed in breadth and scope in accordance with the appended claims.

What is claimed is:

1. A computer-implemented method for detecting a security vulnerability, the computer-implemented method comprising:
    detecting, by a first device, a second device in proximity to the first device, wherein the second device is associated with a first signal strength;
    obtaining, by the first device and based at least in part on a change in at least one of a location, a position, or an orientation of the first device, a second signal strength from the second device;
    determining, after the change in the at least one of the location, the position, or the orientation of the first device, that the first signal strength corresponds to the second signal strength;
    determining, by the first device and based at least in part on the first signal strength corresponding to the second signal strength, that the second device is associated with the first device without authorization from the first device or a monitoring device; and
    based at least in part on determining that the second device is associated with the first device without the authorization, outputting, by the first device, an indication that the second device represents the security vulnerability.

2. The computer-implemented method of claim 1, wherein the first device is at least one of a payment object reader, a point-of-sale (POS) terminal, or a payment application and the second device is an illicit skimmer having a wireless transceiver capable of communicating sensitive data from the first device to an illicit computing device.

3. The computer-implemented method of claim 1, further comprising applying a predictive model to indicate a probability of the second device being fraudulent, and wherein the predictive model is based on one or more characteristics of the second device, wherein the one or more characteristics are selected from a group of characteristics including one or more of timing parameters, emitted power levels, radiated performance, wireless performance, quality of communica-

49 tion links, radio frequency response, transmission measurements, receiver measurements, or engineering tolerances.

4. The computer-implemented method of claim 3, wherein the predictive model is based at least in part on one or more trigger actions comprising:
   introducing the second device in proximity to the first device;
   fraudulently accessing a payment account associated with the first device;
   physically swapping a component of the first device with a component of the second device;
   changing the location of the first device;
   performing a payment transaction using the second device in proximity to the first device;
   performing the payment transaction using the second device in proximity to a first payment entity at or near a time when another payment transaction is in progress at the first device;
   performing the payment transaction for an amount that is more than a predefined amount;
   introducing the second device in a geographical perimeter;
   physically altering the first device;
   obtaining a card read signal;
   obtaining a merchant or server initiated trigger; or
   waiting for lapse of a period of time.

5. The computer-implemented method of claim 3, further comprising generating instructions, to be displayed on a user interface of the first device or a display device, wherein the instructions cause the change in the location, the position, or the orientation of the first device, and the first device is configured to monitor the change in response to the generated instructions using one or more sensors, wherein the change corresponds to one or more of:
   a geographical or physical location of the first device and one or more wireless transceivers embedded therein;
   a linear or angular velocity or acceleration of the first device and the wireless transceivers embedded therein;
   a directional heading of the first device and the wireless transceivers embedded therein;
   a temperature external to the first device and the wireless transceivers embedded therein;
   a tilt or rotation of the first device and the wireless transceivers embedded therein;
   an intensity of light external to the first device and the wireless transceivers embedded therein; or
   a level of sound external to the first device and the wireless transceivers embedded therein.

6. The computer-implemented method of claim 1, wherein the first device is a payment object reader and based at least in part on displaying instructions to cause change to at least one of the orientation or the position of the first device via a user interface of the first device or a display of the first device, determining, using a location tracker associated with the first device, that at least one of the orientation or the position of the first device has changed in response to the instructions.

7. The computer-implemented method of claim 1, wherein determining whether the second device is associated with the first device without authorization further includes one or more of:
   determining whether the second device behaves in a manner substantially similar to the first device;
   determining whether the second device reacts to a sub-routine in a manner substantially similar to the first device;

50 determining whether movement of the second device is substantially similar to that of the first device; or
   determining whether orientation of the second device is substantially similar to that of the first device.

8. The computer-implemented method of claim 3, wherein the predictive model includes a predicted future state of the first device, and the computer-implemented method further includes:
   in response to determining that the second device represents the security vulnerability, canceling or aborting current and past pending payment transactions performed using the first device;
   disabling a connection between the first device and the monitoring device; and
   sending, to a third device of a merchant using a communication identifier associated with at least one of a name, an address, an email address, a phone number, or a payment application, another indication to indicate possibility of the security vulnerability in the first device.

9. The computer-implemented method of claim 1, wherein determining that the second device is associated with the first device without authorization, further includes one or more of:
   determining whether the second signal strength corresponds to a third signal strength of that emitted from the first device;
   determining whether behavior of the second device corresponds to that of the first device;
   determining whether reaction of the second device to a sub-routine corresponds to that of the first device;
   determining whether movement of the second device corresponds to that of the first device; or
   determining whether orientation of the second device corresponds to that of the first device.

10. The computer-implemented method of claim 1, further comprising performing one or more actions to revert the first device to an original state by requesting a user of the first device to re-authorize the first device.

11. A system comprising:
   one or more hardware processors; and
   one or more computer-readable media storing instructions that, when executed by the one or more hardware processors, cause the system to perform operations comprising:
      detecting, by a first device, a second device in proximity to the first device, wherein the second device is associated with a first signal strength;
      obtaining, by the first device and based at least in part on a change in at least one of a location, a position, or an orientation of the first device, a second signal strength from the second device;
      determining, after the change in the at least one of the location, the position, or the orientation of the first device, a similarity between the first signal strength and the second signal strength;
      determining, by the first device and based at least in part on the similarity, whether the second device is associated with the first device without authorization from the first device or a monitoring device; and
      based at least in part on determining that the second device is associated with the first device without the authorization, outputting, by the first device, an indication that the second device represents a security vulnerability.

12. The system of claim 11, wherein the first device is at least one of a payment object reader, a point-of-sale (POS)

terminal, or a payment application and the second device is an illicit skimmer having a wireless transceiver capable of communicating sensitive data from the first device to an illicit computing device.

13. The system of claim 11, the operations further comprising applying a predictive model to indicate a probability of the second device being fraudulent, and wherein the predictive model is based on one or more characteristics of the second device, wherein the one or more characteristics are selected from a group of characteristics including one or more of timing parameters, emitted power levels, radiated performance, wireless performance, quality of communication links, radio frequency response, transmission measurements, receiver measurements, or engineering tolerances.

14. The system of claim 13, wherein the predictive model is based at least in part on one or more trigger actions comprising:
   introducing the second device in proximity to the first device;
   fraudulently accessing a payment account associated with the first device;
   physically swapping a component of the first device with a component of the second device;
   changing the location of the first device;
   performing a payment transaction using the second device in proximity to the first device;
   performing the payment transaction using the second device in proximity to a first payment entity at or near a time when another payment transaction is in progress at the first device;
   performing the payment transaction for an amount that is more than a predefined amount;
   introducing the second device in a geographical perimeter;
   physically altering the first device;
   obtaining a card read signal;
   obtaining a merchant or server initiated trigger; or
   waiting for lapse of a period of time.

15. The system of claim 13, the operations further comprising generating instructions, to be displayed on a user interface of the first device or a display device, wherein the instructions cause the change in the location, the position, or the orientation of the first device, and the first device is configured to monitor the change in response to the instructions using one or more sensors, wherein the change corresponds to one or more of:
   a geographical or physical location of the first device and one or more wireless transceivers embedded therein;
   a linear or angular velocity or acceleration of the first device and the wireless transceivers embedded therein;
   a directional heading of the first device and the wireless transceivers embedded therein;
   a temperature external to the first device and the wireless transceivers embedded therein;
   a tilt or rotation of the first device and the wireless transceivers embedded therein;
   an intensity of light external to the first device and the wireless transceivers embedded therein; or
   a level of sound external to the first device and the wireless transceivers embedded therein.

16. The system of claim 13, wherein the predictive model includes a predicted future state of the first device, and the operations further comprise:
   in response to determining that the second device represents the security vulnerability, canceling or aborting current and past pending payment transactions performed using the first device;
   disabling a connection between the first device and the monitoring device; and
   sending, to a third device of a merchant using a communication identifier associated with at least one of a name, an address, an email address, a phone number, or a payment application, another indication to indicate possibility of a security vulnerability in the first device.

17. The system of claim 11, wherein the first device is a payment object reader and based at least in part on displaying instructions to cause change to at least one of the orientation or the position of the first device via a user interface of the first device or a display of the first device, determining, using a location tracker associated with the first device, that at least one of the orientation or the position of the first device has changed in response to the instructions.

18. The system of claim 11, wherein determining whether the second device is associated with the first device, further includes one or more of:
   determining whether the similarity indicates the first signal strength is a substantially same strength as the second signal strength;
   determining whether the second device behaves in a manner substantially similar to the first device;
   determining whether the second device reacts to a sub-routine in a manner substantially similar to the first device;
   determining whether movement of the second device is substantially similar to that of the first device; or
   determining whether orientation of the second device is substantially similar to that of the first device.

19. The system of claim 11, wherein determining whether the second device is associated with the first device, further includes one or more of:
   determining whether the second signal strength corresponds to a third signal strength associated with the first device;
   determining whether behavior of the second device corresponds to that of the first device;
   determining whether reaction of the second device to a sub-routine corresponds to that of the first device;
   determining whether movement of the second device corresponds to that of the first device; or
   determining whether orientation of the second device corresponds to that of the first device.

20. The system of claim 11, the operations further comprising performing one or more actions to revert the first device to an original state by requesting a user of the first device to re-authorize the first device.

* * * * *